(12) United States Patent
Yamada et al.

(10) Patent No.: US 7,967,680 B2
(45) Date of Patent: Jun. 28, 2011

(54) STORAGE MEDIUM HAVING GAME PROGRAM STORED THEREON AND GAME APPARATUS

(75) Inventors: Yoichi Yamada, Kyoto (JP); Hideya Akasaka, Kyoto (JP); Masaaki Tatsumi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1151 days.

(21) Appl. No.: 11/482,759

(22) Filed: Jul. 10, 2006

(65) Prior Publication Data

US 2007/0167203 A1  Jul. 19, 2007

(30) Foreign Application Priority Data

Jan. 17, 2006  (JP) .................................. 2006-008535

(51) Int. Cl.
*A63F 9/00* (2006.01)
(52) U.S. Cl. ......................................................... 463/31
(58) Field of Classification Search .................. 463/5, 7, 463/8, 47.1, 47.4
See application file for complete search history.

(56) References Cited

U.S. PATENT DOCUMENTS

| | | | | |
|---|---|---|---|---|
| 5,498,003 A * | 3/1996 | Gechter | ............................ | 463/31 |
| 6,270,416 B1 * | 8/2001 | Komoto | ............................ | 463/43 |
| 6,283,861 B1 * | 9/2001 | Kawai et al. | ..................... | 463/43 |
| 6,319,121 B1 * | 11/2001 | Yamada et al. | .................... | 463/8 |
| 6,340,330 B1 * | 1/2002 | Oishi et al. | ......................... | 463/8 |
| 6,454,653 B1 * | 9/2002 | Kawazu | ............................ | 463/43 |
| 6,652,384 B2 * | 11/2003 | Kondo et al. | .................... | 463/54 |
| 7,001,272 B2 * | 2/2006 | Yamashita et al. | ................. | 463/7 |
| 7,131,907 B2 * | 11/2006 | Miida et al. | ......................... | 463/8 |
| 7,331,856 B1 * | 2/2008 | Nakamura et al. | ................. | 463/7 |
| 2001/0016511 A1 * | 8/2001 | Hino et al. | .......................... | 463/8 |
| 2002/0107060 A1 * | 8/2002 | Ohnuma et al. | .................... | 463/7 |
| 2002/0151337 A1 * | 10/2002 | Yamashita et al. | ................. | 463/8 |
| 2003/0211877 A1 * | 11/2003 | Yamada | ............................. | 463/9 |
| 2004/0259615 A1 * | 12/2004 | Mori et al. | ......................... | 463/3 |
| 2005/0101365 A1 * | 5/2005 | Ogita et al. | ........................ | 463/7 |
| 2005/0197186 A1 * | 9/2005 | Ohta | ................................ | 463/30 |
| 2006/0030384 A1 * | 2/2006 | Yoshizawa et al. | ............... | 463/7 |
| 2009/0170579 A1 * | 7/2009 | Ishii et al. | .......................... | 463/2 |
| 2009/0275371 A1 * | 11/2009 | Takahashi et al. | ................. | 463/3 |
| 2010/0160011 A1 * | 6/2010 | Izumi et al. | ........................ | 463/1 |

OTHER PUBLICATIONS

Nui Kuruwa et al , "Zeruda no Densetsu: Kaze no Takuto (The Legend of Zelda: The Wind Waker) Complete Guide", (Enterbrain Inc.), 1st ed., Mar. 31, 2003, p. 26.

* cited by examiner

*Primary Examiner* — Melba Bumgarner
*Assistant Examiner* — Seng Heng Lim
(74) *Attorney, Agent, or Firm* — Nixon & Vanderhye P.C.

(57) ABSTRACT

A first collision determination area and a second collision determination area moving concurrently with a motion of a player character are set, and a collision of the first or second collision determination area against an object is detected. Each time a collision of the first collision determination area against an object is detected, an influence to be exerted on the object which has collided against the first collision determination area is determined as being one of a plurality of preset influences at a predetermined probability. Each time a collision of the second collision determination area against an object is detected, an influence to be exerted on the object which has collided against the second collision determination area is determined as being a predetermined influence. The display state of each object is changed to a display state in accordance with the respectively determined influence.

6 Claims, 14 Drawing Sheets

F I G. 4
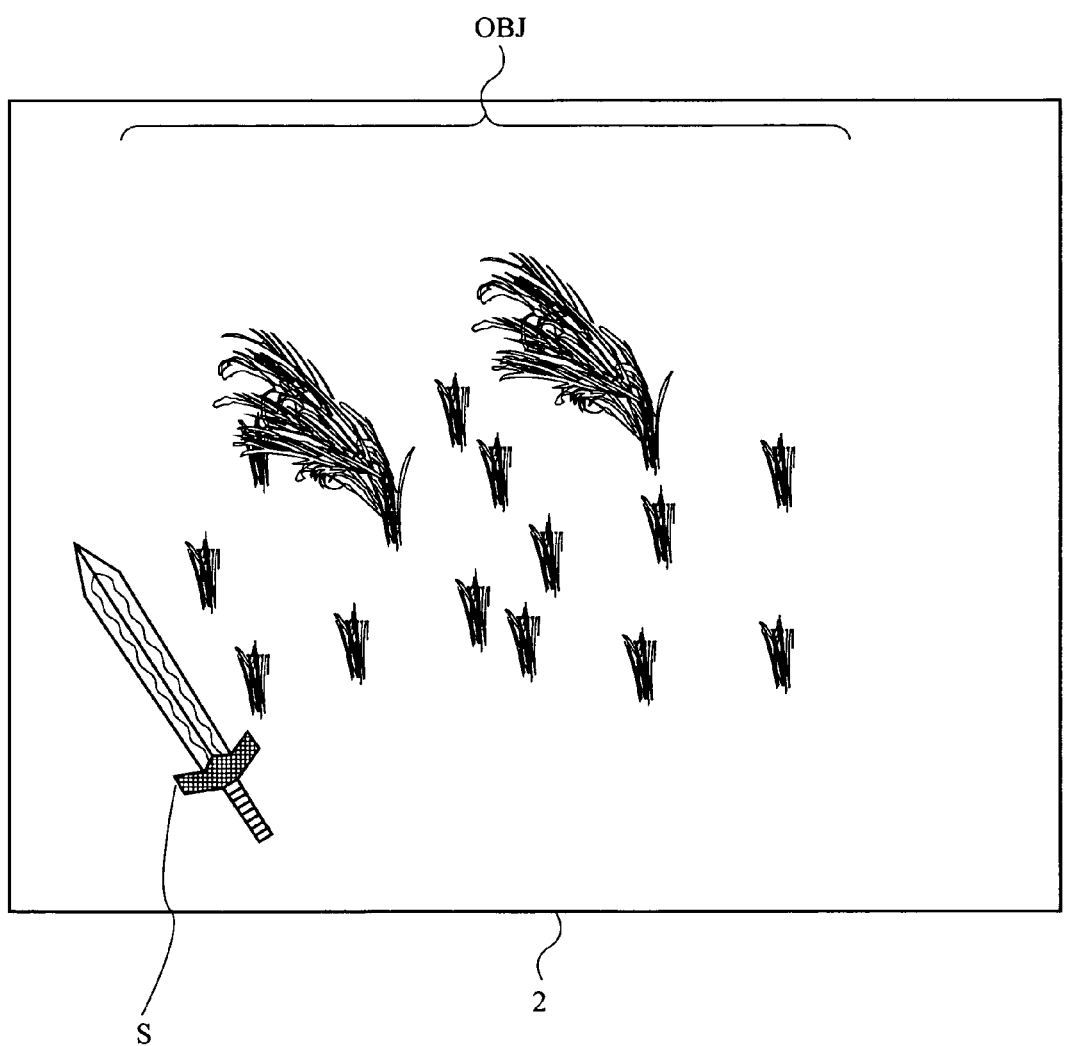

F I G. 7
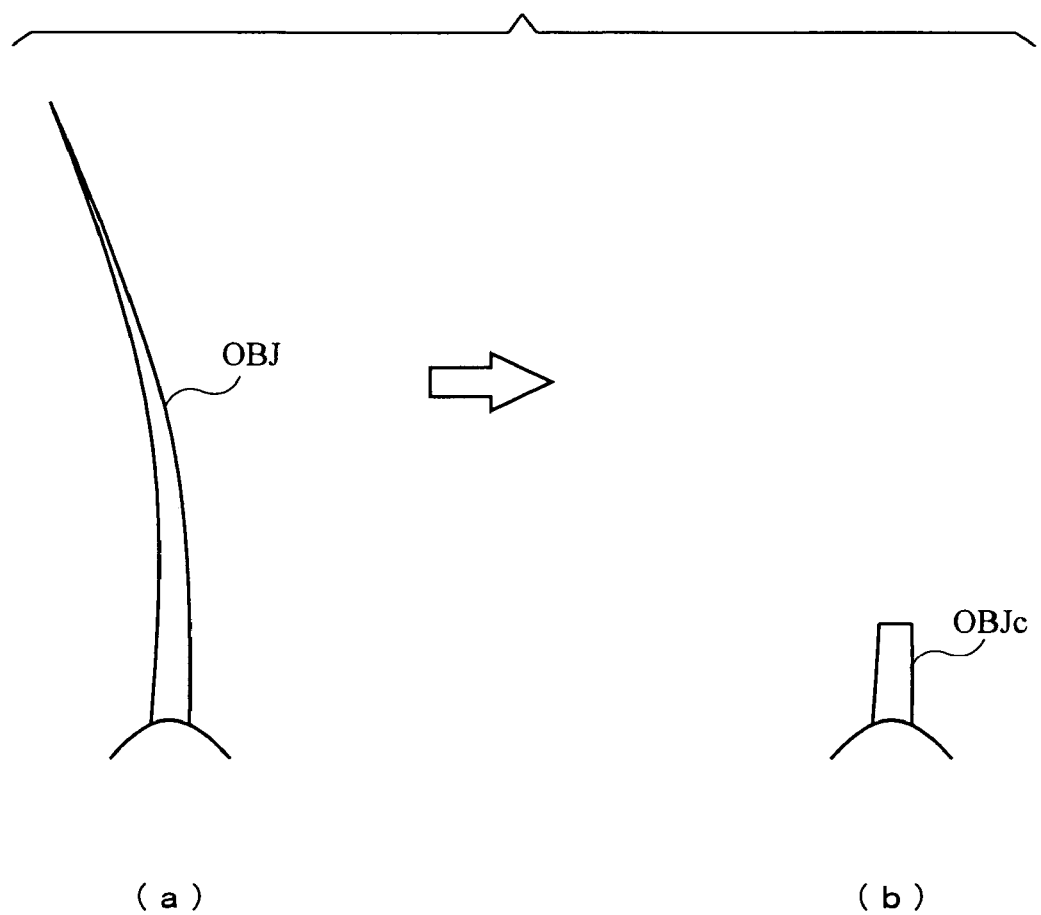
(a)   (b)

F I G. 1 0
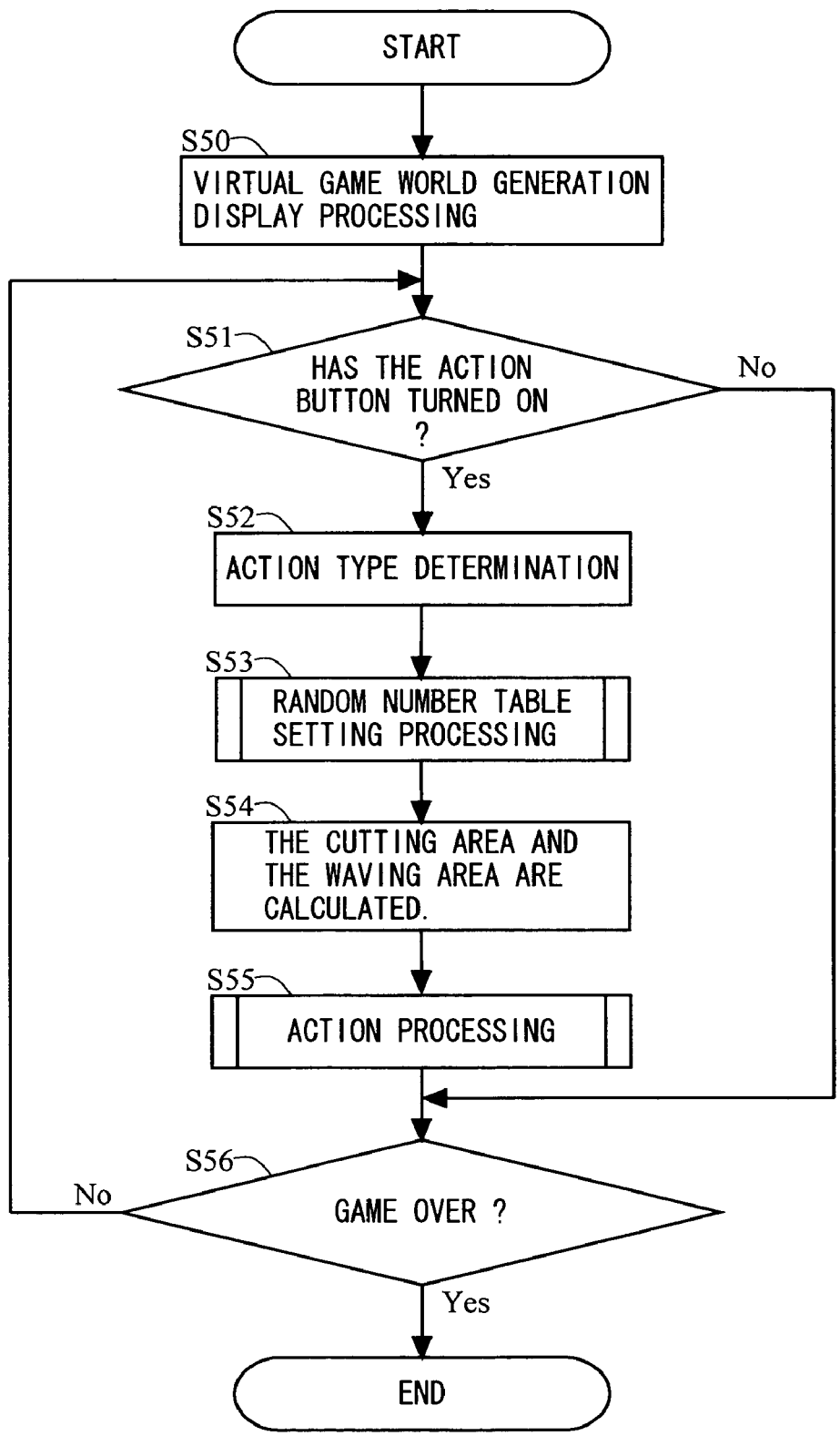

FIG. 13

| TYPE \ RANDOM NUMBER | 1 | 2 | 3 | 4 | 5 | 6 | 7 | 8 | 9 | 10 | 11 | 12 | 13 | 14 | 15 | 16 | PROBABILITY |
|---|---|---|---|---|---|---|---|---|---|---|---|---|---|---|---|---|---|
| A | 0 | 0 | 1 | 0 | 0 | 0 | 1 | 0 | 0 | 0 | 1 | 0 | 0 | 0 | 0 | 0 | 19% |
| B | 0 | 1 | 0 | 0 | 0 | 1 | 0 | 0 | 1 | 0 | 0 | 1 | 0 | 1 | 0 | 0 | 31% |
| C | 1 | 0 | 0 | 0 | 1 | 0 | 0 | 1 | 0 | 0 | 0 | 1 | 0 | 1 | 0 | 1 | 38% |
| D | 0 | 1 | 1 | 0 | 1 | 0 | 1 | 0 | 1 | 0 | 1 | 0 | 0 | 0 | 1 | 0 | 44% |
| E | 1 | 0 | 1 | 0 | 1 | 1 | 1 | 0 | 0 | 1 | 0 | 1 | 1 | 0 | 1 | 1 | 63% |
| F | 1 | 1 | 1 | 1 | 0 | 1 | 1 | 1 | 0 | 1 | 0 | 0 | 1 | 1 | 1 | 1 | 75% |
| G | 1 | 0 | 1 | 1 | 1 | 1 | 1 | 1 | 1 | 1 | 1 | 1 | 1 | 0 | 1 | 1 | 88% |

F I G. 14

| RANDOM NUMBER / TYPE | 1 | 2 | 3 | 4 | 5 | 6 | 7 | 8 | 9 | 10 | 11 | 12 | 13 | 14 | 15 | 16 | DAMAGE LOW ↔ HIGH |
|---|---|---|---|---|---|---|---|---|---|---|---|---|---|---|---|---|---|
| H | 10 | 0 | 10 | 0 | 0 | 0 | 10 | 0 | 0 | 0 | 20 | 0 | 0 | 0 | 0 | 0 | LOW |
| I | 20 | 0 | 0 | 0 | 10 | 0 | 0 | 20 | 0 | 0 | 0 | 20 | 0 | 10 | 0 | 10 | |
| J | 10 | 0 | 30 | 0 | 20 | 40 | 30 | 0 | 0 | 40 | 0 | 10 | 30 | 0 | 40 | 20 | |
| K | 30 | 0 | 50 | 40 | 100 | 70 | 60 | 10 | 80 | 20 | 30 | 40 | 80 | 0 | 60 | 50 | HIGH |

STORAGE MEDIUM HAVING GAME PROGRAM STORED THEREON AND GAME APPARATUS

CROSS REFERENCE TO RELATED APPLICATION

The disclosure of Japanese Patent Application No. 2006-008535 is incorporated herein by reference.

TECHNICAL FIELD

The exemplary embodiments disclosed herein relate to a storage medium having a game program stored thereon and a game apparatus, and in particular to a storage medium having stored thereon a game program influencing an object located in a virtual game world and a game apparatus for executing such a game program.

BACKGROUND AND SUMMARY

Conventionally, a game image is generated by locating various game objects in a virtual game world so as to represent an image close to an image of the real world. An enemy object appears in the virtual game world as an adversary object against a player character operated by a player of the game. For example, as described in "Zeruda no Densetsu: Kaze no Takuto (The Legend of Zelda: The Wind Waker), Complete Guide", composed by Michiru SHIBAHARA, written by Nui KURUWA, Yuichi KINO, Takashi FUNAKO-SHI and Koki YONEDA, edited by Koichiro SHINMOTO, 1st. ed., (Enterbrain Inc.), Mar. 31, 2003, page 26 (hereinafter, referred to as non-patent document 1), action games in which a player character moves around in the virtual game world while defeating an enemy object and the like using an equipment item possessed by the player character (for example, a sword) have been developed.

The action game disclosed in non-patent document 1 proceeds with the player character performing a motion of slashing various game objects including the enemy object using the sword so as to defeat the enemy object which contacted the sword or cut off the game objects. Unlike a game in which a motion of using a sword is used only for attacking the enemy object, this action game enables the sword to be used for cutting off the game objects other than the enemy object and thus exerts a realistic influence on the game objects existing in the virtual game world. In this way, this action game provides the player with a new type of amusement, which makes the game more complicated and more entertaining.

However, in the real world, even when a motion of swinging a sword horizontally is performed on a mass of weeds, it is rare that all the weeds which contacted the sword are cut. Often times, many weeds which contacted the sword remain uncut. In addition, weeds, which are present at a periphery of the area in which the sword was swung and did not directly contact the sword, are waved in the swinging direction of the sword. By contrast, in the above-described action game, when a motion of swinging a sword is performed on various game objects including the enemy object, all the game objects are necessarily slashed after the motion is performed a predetermined number of times. For example, when a motion of swinging a sword is performed on weed objects, all the weed objects which are present in a valid area influenced by the motion are cut off after the motion is performed once. However, the weed objects outside the valid area are not influenced at all. Namely, the phenomenon in the action game is quite different from the phenomenon which can occur in the real world, and the player finds it unnatural depending on the object represented in the game image.

Therefore, a feature of certain exemplary embodiments is to provide a storage medium having stored thereon a game program for allowing an action of a player character to exert a more realistic influence on a game object in a virtual game world, and a game apparatus for executing such a game program.

Certain exemplary embodiments have the following aspects to attain the feature mentioned above. The reference numerals, step numbers (the term "step" is referred to simply as "S" and provided with the respective numerals), numbers of figures, and the like in parentheses in this section of the specification indicate the correspondence with the exemplary embodiments described later for easier understanding, and do not limit the certain exemplary embodiments in any way.

A first aspect of certain exemplary embodiments is directed to a storage medium having stored thereon a game program executable by a computer (30) of a game apparatus (3) for displaying a virtual game world, in which a player character whose motion is controlled by an input signal from an input device (6) in accordance with an operation performed by a player appears as well as a plurality of objects (OBJ), as a game image on a display screen (2). The game program causes the computer to execute a determination area setting step (S50), a collision detection step (S73), a first influence determination step (S75), a second influence determination step (S78), and a display state changing step (S80, S81). The determination area setting step sets a first collision determination area (C2) and a second collision determination area (C1) moving concurrently with the motion (D2a) of the player character. The collision detection step detects a collision of one of the first collision determination area and the second collision determination area against an object among the plurality of objects (contact of C1 through C2 with Cobj). The first influence determination step, each time the collision detection step detects a collision of the first collision determination area against an object, determines an influence, to be exerted on the object which has collided against the first collision determination area, as being one of a plurality of preset influences (cut off, waved, damage degree, no influence, etc.) at a predetermined probability. The second influence determination step, each time the collision detection step detects a collision of the second collision determination area against an object, determines an influence, to be exerted on the object which has collided against the second collision determination area, as being a predetermined influence. The display state changing step changes a display state of each of the influenced objects to a display state in accordance with the influence determined by each of the first influence determination step and the second influence determination step (FIG. 4, FIG. 7, FIG. 8).

In a second aspect based on the first aspect, the determination area setting step sets areas adjacent to each other as the first collision determination area and the second collision determination area.

In a third aspect based on the first aspect, the collision detection step includes a passing area setting step (S61). The passing area setting step sets a passing area (A2) in which the first collision determination area passes along with the motion of the player character before the motion is started.

In a fourth aspect based on the third aspect, the first influence determination step includes a probability determination step. The probability determination step determines the predetermined probability in accordance with the number of objects included in the passing area.

In a fifth aspect based on the fourth aspect, when the passing area includes a relatively large number of objects, the probability determination step determines a probability, at which the influence is determined as being a first influence (cutoff) included in the plurality of preset influences, to be relatively low; and when the passing area includes a relatively small number of objects, the probability determination step determines a probability, at which the influence is determined as being the first influence, to be relatively high (S62, S63).

In a sixth aspect based on the fifth aspect, the probability determination step determines the predetermined probability for each type of objects located in the passing area in accordance with the number of the objects of each type.

In a seventh aspect based on the third aspect, the first influence determination step includes a random number table determination step (S63). The random number table determination step stores, in a storage section (33), a plurality of random number tables (D2c, FIG. 13, FIG. 14) each describing an influence to be exerted on each object at a predetermined probability, and determines a random number table, among the plurality of random number tables, to be used for objects included in the passing area in accordance with the number of the objects. The first influence determination step determines an influence to be exerted on an object which has collided against the first collision determination area in accordance with the description in the determined random number table.

In an eighth aspect based on the seventh aspect, the random number table determination step selects a random number table to be used for each type of objects located in the passing area in accordance with the number of the objects of each type (S62, S63).

In a ninth aspect based on the first aspect, the determination area setting step further sets a third collision determination area (C3) moving concurrently with the first collision determination area and the second determination area and also with the motion of the player character (S54). The collision detection step further detects a collision of the third collision determination area against an object. The game program causes the computer to execute a third influence determination step (S79). The third influence determination step, each time the collision detection step detects a collision of the third collision determination area against an object, determines an influence, to be exerted on the object which has collided against the third collision determination area, as being a predetermined influence. The display state changing step changes the display state of each of the influenced objects to a display state in accordance with the influence determined in the third influence determination step.

In a tenth aspect based on the ninth aspect, the second influence determination step determines an influence, to be exerted on an object which has collided against the second collision determination area, as being a first influence included in a plurality of preset influences. The first influence determination step determines an influence, to be exerted on an object which has collided against the first collision determination area, as being the first influence at a predetermined probability. The third influence determination step determines an influence, to be exerted on an object which has collided against the third collision determination area, as being a second influence (waved) which different from the first influence.

In an eleventh aspect based on the first aspect, the plurality of objects include enemy objects each associated with a stamina value which decreases in accordance with a damage degree based on the motion of the player character. The first influence determination step determines an influence, to be exerted on each enemy object which is detected to have collided against the first collision determination area, as being a damage degree selected, at a predetermined probability, from a plurality of damage degrees to be subtracted from the stamina value. The second influence determination step determines an influence, to be exerted on each enemy object which is detected to have collided against the second collision determination area, as being a predetermined damage degree. The display state changing step changes the display state of each enemy object, which is detected to have collided against the first collision determination area or the second collision determination area, to a display state in accordance with a post-decrease stamina value obtained after the stamina value of the enemy object is decreased in accordance with the determined damage degree.

In a twelfth aspect based on the first aspect, the plurality of objects include enemy objects each associated with a stamina value which decreases in accordance with a damage degree based on the motion of the player character. The first influence determination step determines an influence, to be exerted on each enemy object which is detected to have collided against the first collision determination area, as being a damage degree calculated under a predetermined condition. The second influence determination step determines an influence, to be exerted on each enemy object which is detected to have collided against the second collision determination area, as being a predetermined damage degree. The display state changing step changes the display state of each enemy object, which is detected to have collided against the first collision determination area or the second collision determination area, to a display state in accordance with a post-decrease stamina value obtained after the stamina value of the enemy object is decreased in accordance with the determined damage degree.

In a thirteenth aspect based on the third aspect, the plurality of objects include enemy objects each associated with a stamina value which decreases in accordance with a damage degree based on the motion of the player character. When the passing area includes a relatively large number of enemy objects, the first influence determination step determines an influence to be exerted on each enemy object as being one of a plurality of preset damage degrees which decreases by a low degree at a relatively high probability; and when the passing area includes a relatively small number of enemy objects, the first influence determination step determines an influence to be exerted on each enemy object as being one of the plurality of preset damage degrees which decreases by a high degree at a relatively high probability. The display state changing step changes the display state of each enemy object, which is detected to have collided against the first collision determination area or the second collision determination area, to a display state in accordance with a post-decrease stamina value obtained after the stamina value of the enemy object is decreased in accordance with the determined damage degree.

In a fourteenth aspect based on the third aspect, the plurality of objects include enemy objects each associated with a stamina value which decreases in accordance with a damage degree based on the motion of the player character. When the passing area includes a relatively large number of enemy objects, the first influence determination step determines an influence to be exerted on each enemy object as being a damage degree which is calculated as decreasing by a low degree at a relatively high probability; and when the passing area includes a relatively small number of enemy objects, the first influence determination step determines an influence to be exerted on each enemy object as being a damage degree which is calculated as decreasing by a high degree at a relatively high probability. The display state changing step changes the display state of each enemy object, which is detected to have collided against the first collision determination area or the second collision determination area, to a display state in accordance with a post-decrease stamina value obtained after the stamina value of the enemy object is decreased in accordance with the determined damage degree.

A fifteenth aspect of certain exemplary embodiments is directed to a game apparatus for displaying a virtual game world, in which a player character whose motion is controlled by an input signal from an input device in accordance with an operation performed by a player appears as well as a plurality of objects, as a game image on a display screen. The game apparatus comprises determination area setting means, collision detection means, first influence determination means, second influence determination means, and display state changing means. The determination area setting means sets a first collision determination area and a second collision determination area moving concurrently with the motion of the player character. The collision detection means detects a collision of one of the first collision determination area and the second collision determination area against an object among the plurality of objects. The first influence determination means, each time the collision detection means detects a collision of the first collision determination area against an object, determines an influence, to be exerted on the object which has collided against the first collision determination area, as being one of a plurality of preset influences at a predetermined probability. The second influence determination means, each time the collision detection means detects a collision of the second collision determination area against an object, determines an influence, to be exerted on the object which has collided against the second collision determination area, as being a predetermined influence. The display state changing means changes a display state of each of the influenced objects to a display state in accordance with the influence determined by each of the first influence determination means and the second influence determination means.

According to the first aspect, each object as a target of an action performed by the player character (for example, an object to be slashed by a sword) is changed by an influence selected from a plurality of influences at a predetermined probability. Therefore, all the objects are not changed by the same influence. For example, in the case where the motion of the player character has an influence of cutting off the target objects, a state in which some of the objects are cut off but the other objects are not cut off can be represented. In addition, the virtual game world can include an area in which all the target objects are changed by the same influence by the motion of the player character and also an area in which the target objects are changed by an influence at a predetermined probability. For example, an area in which all the objects are cut off by the motion of the player character, and an area in which some objects are cut off but the other objects are not cut off, can be formed. Owing to this, the action performed by the player character in the virtual game world can exert an influence closer to the influence of the real world on the objects.

According to the second aspect, an area in which all the target objects are changed by the same influence by the motion of the player character, and an area in which the target objects are changed by an influence at a predetermined probability, can be adjacent to each other in the virtual game world.

According to the third aspect, a passing area in which the first collision determination area passes is obtained in advance. Therefore, the influence can be determined as being one influence at a probability in accordance with the state of the passing area in the virtual game world.

According to the fourth aspect, the probability is determined in accordance with the number of objects in the passing area. Therefore, the objects can be represented as being changed by different influences at a probability or cycle in accordance with the number of the target objects.

According to the fifth aspect, when the number of objects as targets of the motion of the player character is increased, the probability at which the first influence is exerted on each object is decreased. When the number of objects as targets of the motion of the player character is decreased, the probability at which the first influence is exerted on each object is increased. For example, when the player character attempts to cut a large number of objects at once, the number of objects which are cut is decreased. When the player character attempts to cut a small number of objects at once, the number of objects which are cut is increased. Owing to this, even when the player character performs a motion of cutting a large number of objects, the player character initially cannot cut all the objects. While the motion is repeated, the number of objects which are cut increases. Thus, the game provides the player with a sense of reality.

According to the sixth aspect, the probability is determined in accordance with the number of objects of each type located in the passing area. Therefore, the objects can be represented as being changed by different influences at a probability in accordance with the number of the target objects of each type.

According to the seventh aspect, the influence to be exerted on the objects is determined in accordance with a preset random number table. Therefore, the objects can be represented as being changed by different influences at a probability or cycle in accordance with the number of the target objects of each type.

According to the eighth aspect, the random number table is selected in accordance with the number of the objects of each type. Therefore, the objects can be represented as being changed by different influences at a probability or cycle in accordance with the number of the target objects of each type.

According to the ninth aspect, the virtual game world can include two areas in which all the target objects are changed by the same influence by the motion of the player character (the influence of each area may be different) and also an area in which the target objects are changed by an influence at a predetermined probability.

According to the tenth aspect, the virtual game world can include an area in which all the target objects are changed by the first influence by the motion of the player character, an area in which all the target objects are changed by the second influence, different from the first influence, by the motion of the player character, and an area in which the target objects are changed by the first influence at a predetermined probability. For example, an area in which all the objects are cut off by the motion of the player character, an area in which all the objects are agitated without being cut off, and an area some objects are cut off but the other objects are not cut off, can be formed.

According to the eleventh and twelfth aspects, the stamina value of each enemy object as a target of the action performed by the player character (for example, an enemy object to be slashed by the sword) decreases by a damage degree selected at a predetermined probability, each time the enemy object collides against the first collision determination area. For example, in the case where a plurality of enemy objects are targets of action performed by the player character, the enemy objects can be represented as being damaged at different degrees.

According to the thirteenth and fourteenth aspects, when the number of enemy objects as targets of the motion of the player character is increased, the damage degree to each enemy object is decreased. For example, when the player character attempts to slash a large number of enemy objects at once, the damage degree to each enemy object is decreased (the stamina value decreases by a small amount). When the player character attempts to cut a small number of enemy objects at once, the damage degree to each enemy object is increased (the stamina value decreases by a large amount). Owing to this, when the player character performs a motion of slashing a large number of enemy objects at once, the damage degree to each enemy object is decreased like in the real world. Thus, the game appears realistic.

A game apparatus according to certain exemplary embodiments provides substantially the same effects as those of the storage medium according to the exemplary embodiments described above.

These and other features, aspects and advantages of the exemplary embodiments described herein will become more apparent from the following detailed description when taken in conjunction with the accompanying drawings.

BRIEF DESCRIPTION OF THE DRAWINGS

FIG. 4 shows an exemplary image displayed on the monitor 2 after the action of brandishing the sword object S is performed;

FIG. 7 shows an animation of an object OBJ being cut off;

FIG. 10 is a flowchart illustrating game processing executed by the game apparatus 3 for causing a player character to perform an action;

FIG. 13 shows exemplary random number tables usable for processing weed objects OBJ; and FIG. 14 shows exemplary random number tables usable for processing enemy objects.

DETAILED DESCRIPTION

Figure 1:
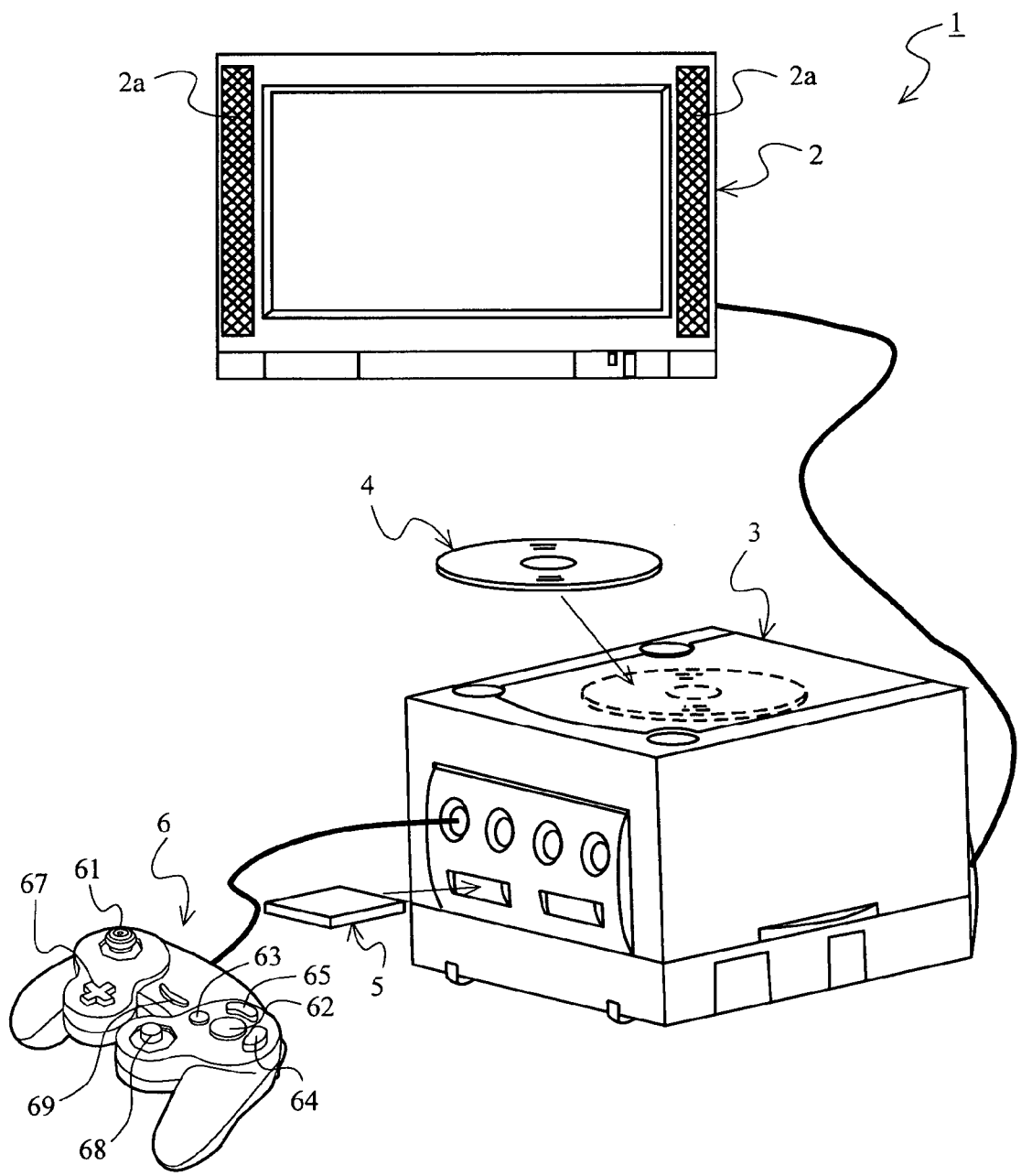
FIG. 1 is an external view of a game system 1 according to an exemplary embodiment.

Hereinafter, certain exemplary embodiments will be described with reference to the drawings. The exemplary embodiments are not limited to the following description. With reference to FIG. 1, a game system 1 according to one exemplary embodiment will be described. FIG. 1 is an external view illustrating the game system 1. In the following description, the game system 1 includes an installation type game apparatus as an example.

As shown in FIG. 1, the game system 1 includes an installation-type game apparatus (hereinafter, referred to simply as a "game apparatus") 3, which is connected to a CRT (Cathode Ray Tube) display (hereinafter, referred to as a "monitor") 2 including a speaker 2a, such as a home-use TV receiver or the like via a connection cord. The game system 1 includes a controller 6 connected to the game apparatus 3 via a connection cord and an optical disc 4 as an exemplary information storage medium which is exchangeably mountable on the game apparatus 3. On the game apparatus 3, an external memory card 5 having a backup memory or the like for fixedly storing saved data or the like is mounted when necessary. The game apparatus 3 executes a game program stored on the optical disc 4 and displays the result on the monitor 2 as a game image. The game apparatus 3 can also reproduce a state of a game played in the past using saved data stored on the external memory card 5 and display the game image on the monitor 2. A player playing with the game apparatus 3 can enjoy the game by operating the controller 6 while watching the game image displayed on the monitor 2. When a plurality of players play the game, a plurality of controllers 6 can be connected to the game apparatus 3. The plurality of players can enjoy the game by operating the respective controller 6 while watching the game image on the monitor 2.

The controller 6 is detachably connected to the game apparatus 3 via the connection cord as described above. The controller 6 is operation means mainly for performing an operation on a player object appearing in a game space displayed on the monitor 2. The controller 6 includes an input section having operation buttons, keys, a stick and the like. Specifically, the controller 6 includes a grip section to be held by the player. The controller 6 includes a main stick 61 and a cross-shaped key 62 which are operable by the thumb or the like of the left hand of the player, and a C stick 67, an A button 62, a B button 63, an X button 64, a Y button 65, and a start/pause button 69 which are operable by the thumb or the like of the right hand of the player. The controller 6 also includes an R button (not shown) operable by the index finger or the like of the right hand of the player, and an L button (not shown) operable by the index finger or the like of the left hand of the player. As described in more detail later, a motion of the player character swinging or brandishing a sword or the like is started by, for example, the player pressing the A button 62. Other input sections are used as the game proceeds as described later, but are not directly relevant to embodiments described herein and will not be described in detail.

The optical disc 4 has stored thereon a game program, which is a group of instructions and a group of data of a format executable by a computer of the game apparatus 3, especially a CPU 30 (described below). The game program is read onto a main memory 33 when necessary and executed. In the following example, the game program stored on the optical disc 4 is executed.

Figure 2:
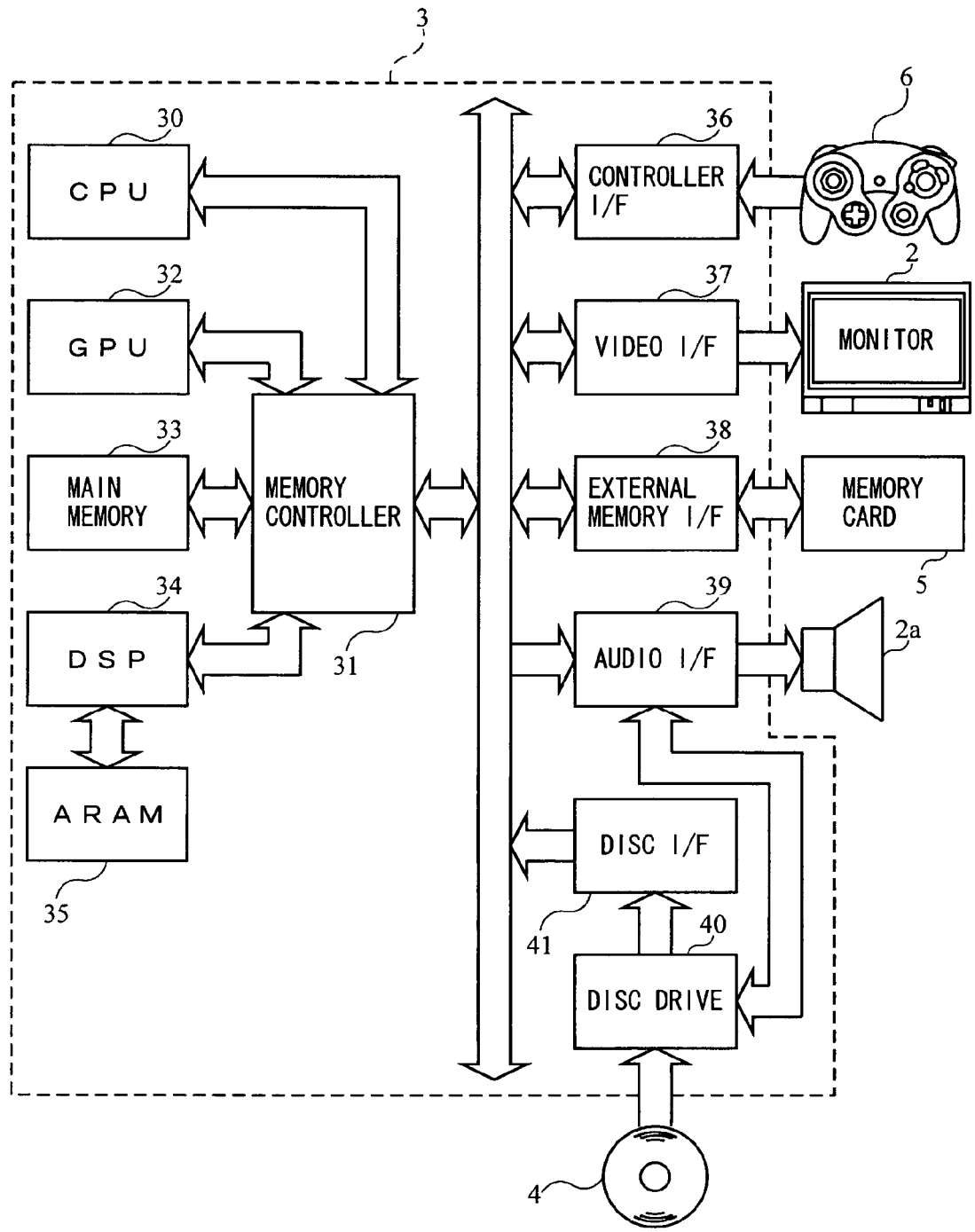
FIG. 2 is a functional block diagram of a game apparatus 3 shown in FIG. 1.

Now, with reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 30 for executing various types of programs. The CPU 30 executes a start program stored in a boot ROM (not shown) to, for example, initialize the main memory 33 and other memories. Then, the CPU 30 executes a game program stored on the optical disc 4 to execute game processing in accordance with the game program. The CPU 30 is connected to a GPU (Graphics Processing Unit) 32, the main memory 33, a DSP (Digital Signal Processor) 34, and an ARAM (Audio RAM) 35 via a memory controller 31. The memory controller 31 is connected to a controller I/F (interface) 36, a video I/F 37, an external memory I/F 38, an audio I/F 39, and a disc I/F 41 via a predetermined bus. The controller I/F 36, the video I/F 37, the external memory I/F 38, the audio I/F 39 and the disc I/F 41 are respectively connected to the controller 6, the monitor 2, the external memory card 5, the speaker 2a and a disc drive 40.

The GPU 32 performs image processing based on an instruction from the CPU 30. The GPU 32 includes, for example, a semiconductor chip for performing calculation processing necessary for displaying 3D graphics. The GPU 32 performs the image processing using a memory dedicated for image processing (not shown) or a part of the storage area of the main memory 33. The GPU 32 generates game image data of an image to be displayed on the monitor 2 using such a memory, and outputs the generated data to the monitor 2 via the memory controller 31 and the video I/F 37 as necessary.

The main memory 33 is a storage area used by the CPU 30, and stores a game program, game data or the like necessary for processing performed by the CPU 30 as necessary. For example, the main memory 33 stores a game program read from the optical disc 4 by the CPU 30, various types of data or the like. The game program, the various types of data or the like stored in the main memory 33 are executed by the CPU 30.

The DSP 34 processes sound data or the like generated by the CPU 30 during the execution of the game program. The DSP 34 is connected to the ARAM 35 for storing the sound data or the like. The ARAM 35 is used when the DSP 34 performs predetermined processing (for example, storage of the game program or sound data already read). The DSP 34 reads the sound data stored in the ARAM 35 and outputs the sound data to the speaker 2a included in the monitor 2 via the memory controller 31 and the audio I/F 39.

The memory controller 31 comprehensively controls data transfer, and is connected to the various I/Fs described above. The controller I/F 36 includes, for example, four controller I/Fs 36a through 36d, and communicably connects the game apparatus 3 to an external device which is engageable via connectors of the controller I/Fs 36a through 36d. For example, the controller 6 is engaged with such a connector and is connected to the game apparatus 3 via the controller I/F 36. The video I/F 37 is connected to the monitor 2. The external memory I/F 38 is connected to the external memory card 5 and is accessible to the backup memory or the like provided in the external card 5. The audio I/F 39 is connected to the speaker 2a built in the monitor 2, and is connected such that the sound data read by the DSP 34 from the ARAM 35 or sound data directly output from the disc drive 40 is output from the speaker 2a. The disc I/F 41 is connected to the disc drive 40. The disc drive 40 reads data stored at a predetermined reading position of the optical disc 4 and outputs the data to a bus of the game apparatus 3 or the audio I/F 39.

A game program according to certain exemplary embodiments may be supplied to the game apparatus 3 via an external storage medium such as the optical disc 4 or the like, or via a wired or wireless communication line. The game program may be pre-stored on a non-volatile storage device in the game apparatus 3. The information storage medium for storing the game program may be a CD-ROM, a DVD, a DVD, other types of optical disc-shaped storage medium, or a non-volatile semiconductor memory device.

Figure 3:
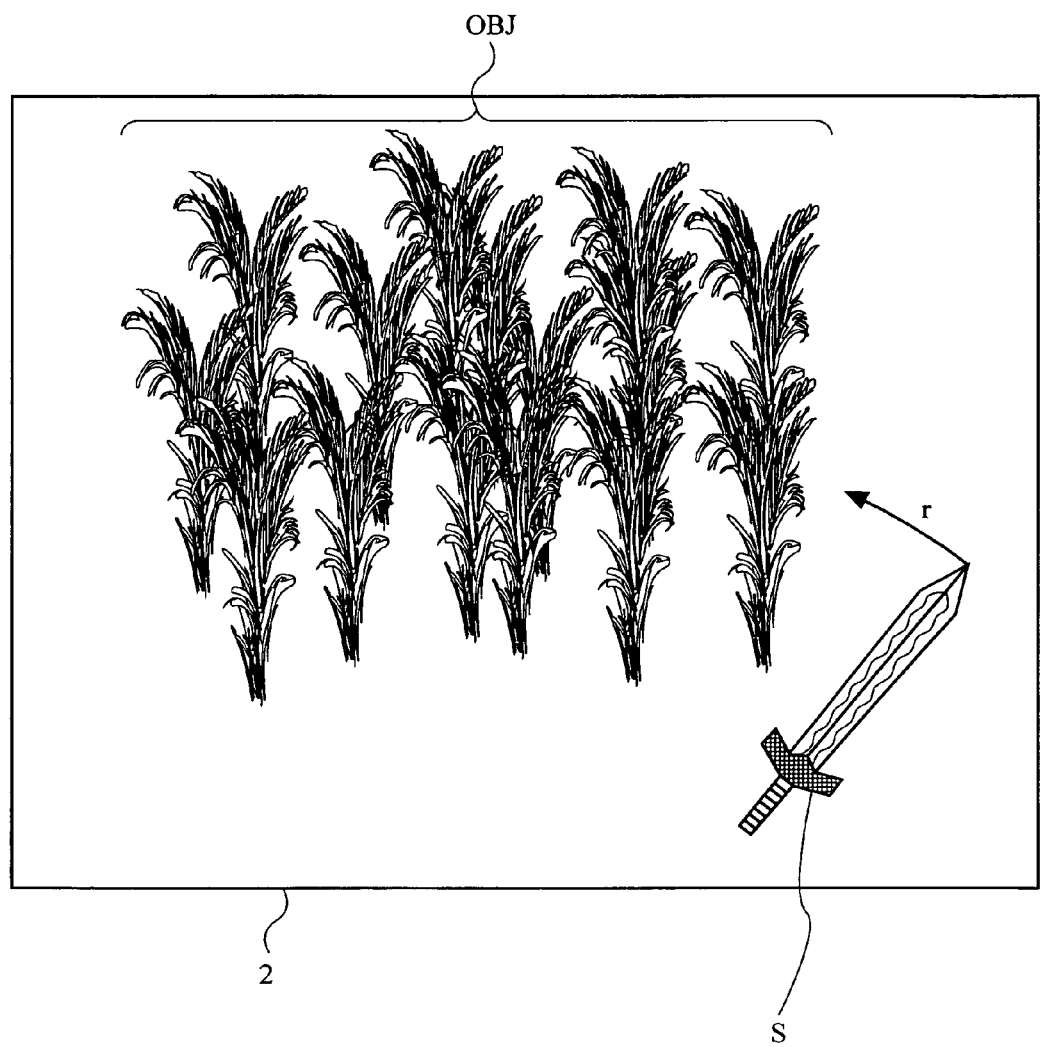
FIG. 3 shows an exemplary image displayed on a monitor 2 before an action of brandishing a sword object S is performed.
Figure 5:
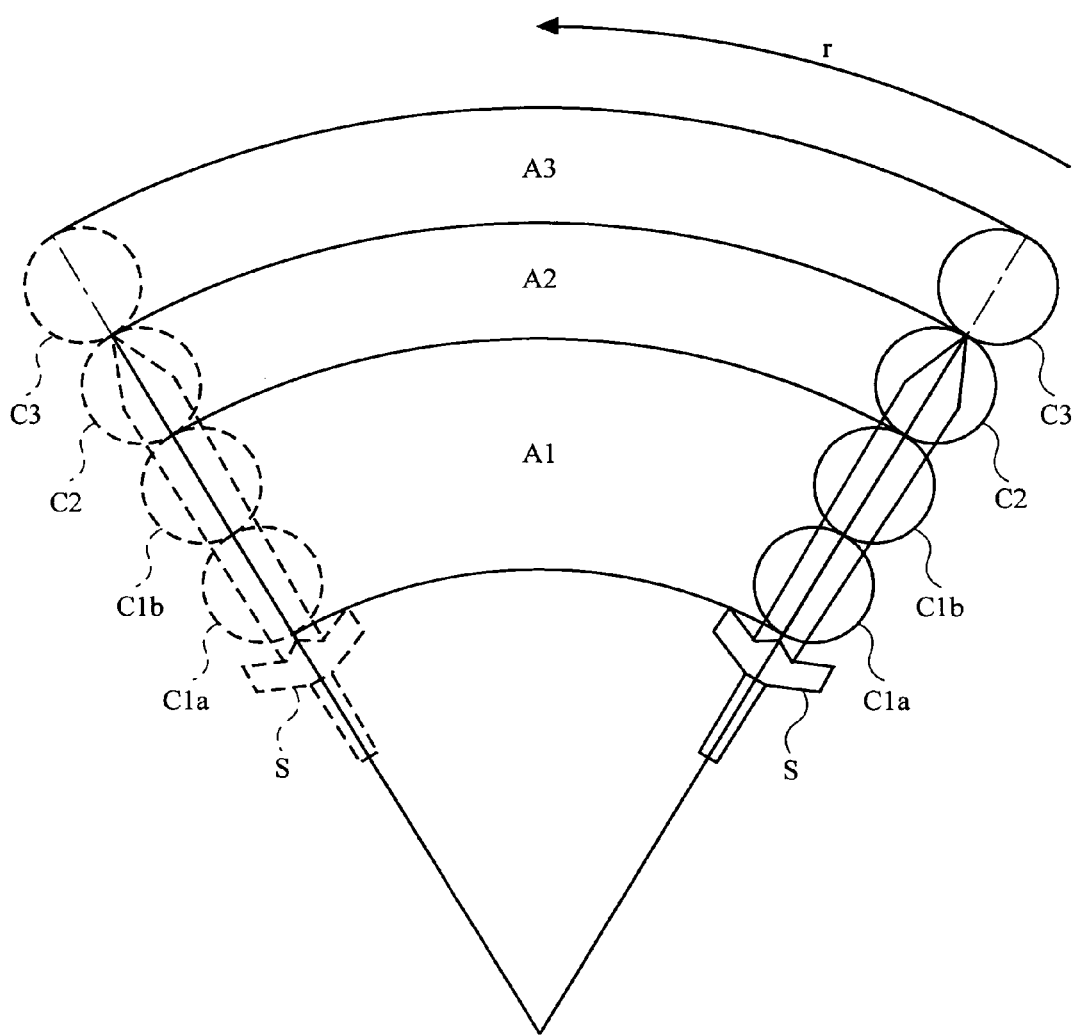
FIG. 5 shows an action area including areas A1 through A3 which are set in accordance with collisions C1 through C3 defined for the sword object S.
Figure 6:
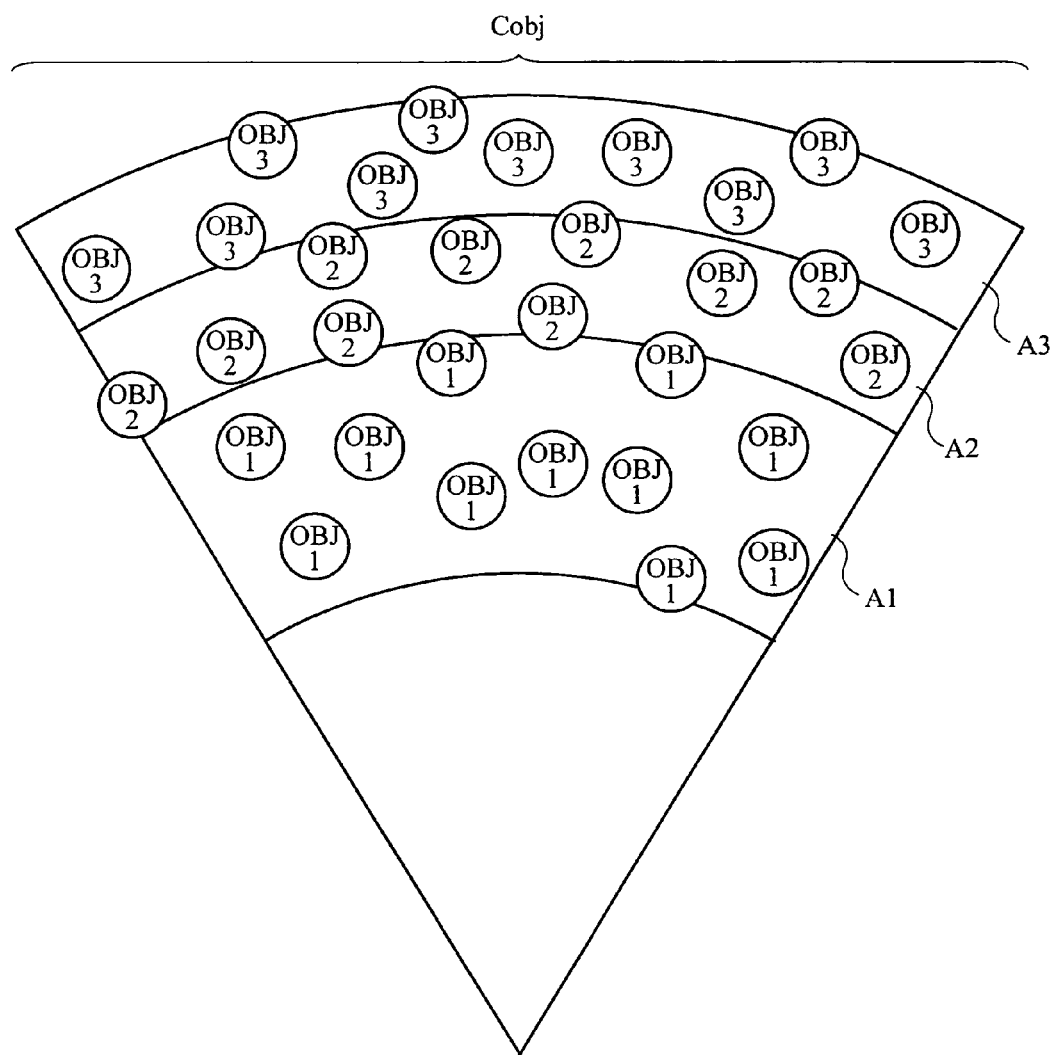
FIG. 6 shows collisions defined for objects OBJ1 through OBJ3 respectively located in the areas A1 through A3.
Figure 8:
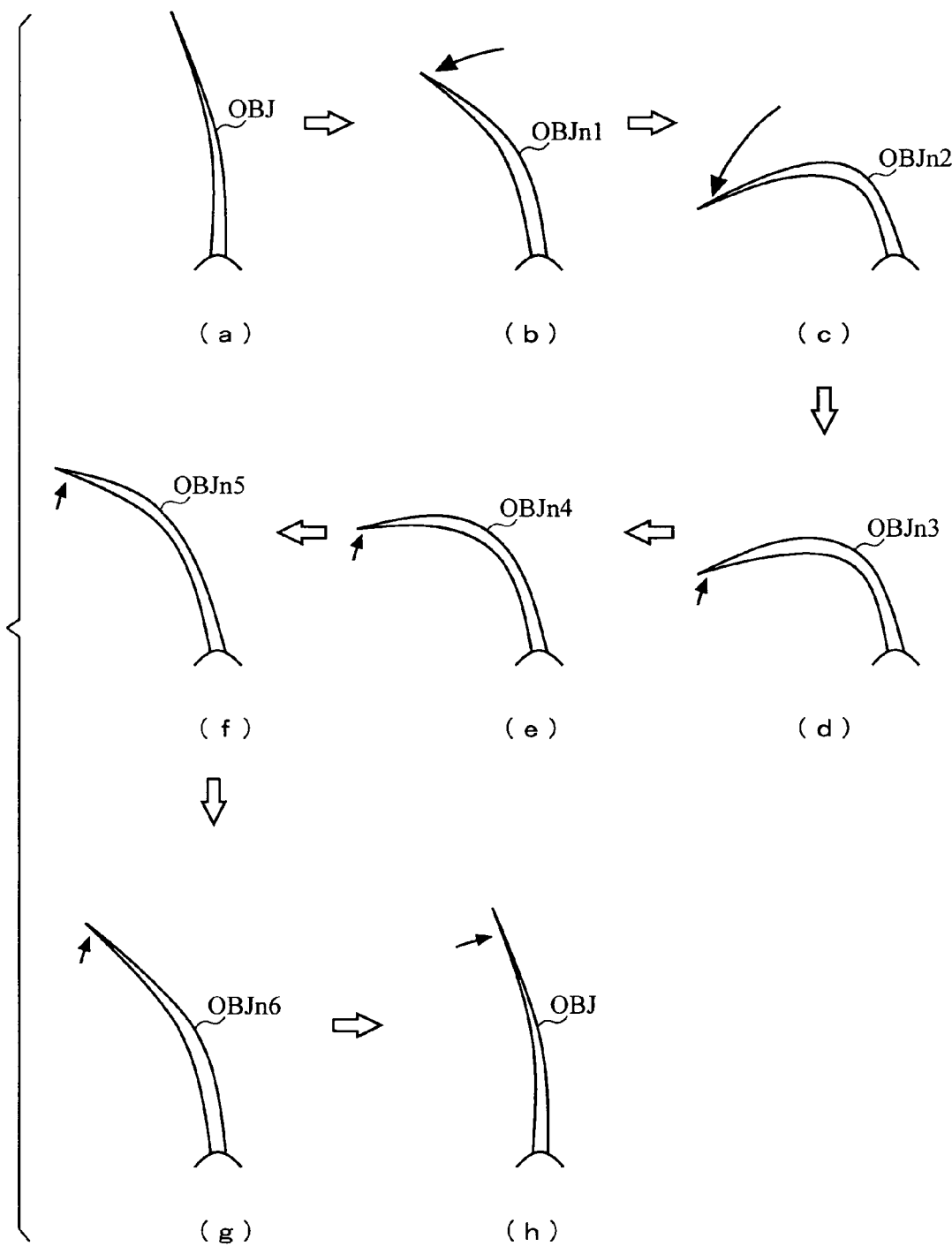
FIG. 8 shows an animation of the object OBJ being waved.

With reference to FIG. 3 through FIG. 8, exemplary images displayed on the monitor 2 by the game processing, the exemplary operations of processing and the like will be described. After that, a specific processing operation of the game program executed by the game apparatus 3 will be described. As a specific example, the processing executed for causing the player character to perform a motion of slashing a mass of weeds using a sword will be explained hereinafter. FIG. 3 shows an exemplary image displayed on the monitor 2 before the motion of slashing the mass of weeds using a sword object S is performed. FIG. 4 shows an exemplary image displayed on the monitor 2 after the motion of slashing the mass of weeds using the sword object S is performed. FIG. 5 shows an action area including areas A1 through A3 which are set in accordance with collisions C1 through C3 defined for the sword object S. FIG. 6 shows collisions defined for objects OBJ1 through OBJ3 respectively located in the areas A1 through A3. FIG. 7 shows an animation of an object OBJ being cut off. FIG. 8 shows an animation of the object OBJ being waved.

Referring to FIG. 3, the game apparatus 3 generates a game image representing a virtual game world in which various game objects are located, and displays the game image on the monitor 2. In the example of FIG. 3, a plurality of weed objects OJB are located on a game field and displayed on the monitor 2 in order to represent a mass of weeds in the field. The player can cause the weed objects OJB which have contacted the sword object S to be cut off by conducting an operation (for example, pressing the A button 62) to cause the player character (not shown) to perform a motion of brandishing the sword object S. When, for example, the player conducts an operation to cause the player character to brandish the sword, the sword object S is swung at a predetermined angle so as to draw a circle in a generally horizontal direction around the player character (in the direction of arrow r in FIG. 3; hereinafter, referred to as a "sword brandishing direction").

Referring to FIG. 4, when the sword object S contacts the weed objects OBJ, some of the weed objects OBJ are cut off by the sword object S in accordance with the location thereof or the processing condition. Even when the sword object S contacts the weed objects OBJ, some weed objects OBJ may be waved on the game field without being cut off in accordance with the location thereof or the processing condition. Thus, when the player character performs a motion of slashing the mass of weeds using the sword, all the weeds which contacted the sword are not cut off at once but a part of the mass of weeds is displayed as remaining without being cut off and waving.

Referring to FIG. 5, the sword object S has a plurality of collisions C1 through C3. The collisions C1 through C3 are provided in order to determine whether or not the sword object S has collided against any other object. The collisions C1 through C3 is each formed of, for example, an invisible cylinder or sphere. Specifically, the collisions C1 and C2 are set at a blade of the sword object S. In the example of FIG. 5, two collisions C1 (collisions C1a and C1b) are set. The collisions C1a, C1b and C2 are located on the blade in the longitudinal direction thereof in this order toward the tip of the blade. The collisions C1a and C1b are in contact with each other, and the collisions C1b and C2 are in contact with each other. The collision C3 is located in contact with the collision C2 in the longitudinal direction of the blade, i.e., outside the tip of the blade of the sword object S. Namely, the collision C2 is located on the tip of the blade of the sword object S; and the collision C3 is located on a phantom line extended from the tip of the blade, i.e., in an area where the blade does not exist.

When the sword object S is swung in the sword brandishing direction, the collisions C1 through C3 move together with the sword object S. In FIG. 5, the dashed lines represent the positions of the sword object S and the collisions C1 through C3 at the end of the swing. For example, when the sword object S is swung in the direction of arrow r shown in FIG. 5, an area A1 in which the collisions C1a and C1b pass, an area A2 in which the collision C2 passes, and an area A3 in which the collision C3 passes are set. Specifically, the area A1 has a shape of an outer portion of a fan expanding at a predetermined angle around the coordinate set at which the player character is positioned in the virtual game world. The area A2 is an arc-shaped area bordering, and located outside, the area A1. The area A3 is an arc-shaped area bordering, and located outside, the area A2. The entirety of the areas A1 through A3 is set as an "action area" when the player character performs a motion of brandishing the sword object S. The area A1 is set as a "cutting area", the area A2 is set as an "influence changing area", and the area A3 is set as a "waving area". The collision C2 corresponds to a first collision determination area according to certain exemplary embodiments. The collision C1 (the collisions C1a and C1b) corresponds to a second collision determination area according to certain exemplary embodiments. The collision C3 corresponds to a third collision determination area according to certain exemplary embodiments. The area A2 corresponds to a passing area according to certain exemplary embodiments.

Referring to FIG. 6, the weed objects OBJ each have a collision Cobj. Each collision Cobj is provided in order to determine whether or not the respective weed object OBJ has collided against the sword object S. The collision Cobj is formed of, for example, an invisible cylinder. When one of the collisions C1 through C3 provided for the sword object S contacts a collision Cobj provided for a weed object OBJ, an action (or a motion) is performed on the weed object OBJ. In this exemplary embodiment, weed objects OBJ1 located in the cutting area A1 are all cut off when the corresponding collisions Cobj contact the collision C1 provided on the blade of the sword object S. Weed objects OBJ3 located in the waving area A3 are all waved when the corresponding collisions Cobj contact the collision C3 provided outside the tip of the blade of the sword object S. Weed objects OBJ2 located in the influence changing area A2 are cut off or waved when the corresponding collisions Cobj contact the collision C2 provided on the tip of the blade of the sword object S.

With reference to FIG. 7, how a weed object OBJ is cut off will be described. There are a plurality of patterns of object images for representing how a weed object OBJ is cut off on the monitor 2. Part (a) of FIG. 7 shows an object image of a pre-cutoff object OBJ. Part (b) of FIG. 7 shows an object image of a post-cutoff weed object OBJc. For representing how the weed object OBJ is cut off, object images of the pre-cutoff weed object OBJ and object images of the post-cutoff weed object OBJc are sequentially displayed on the monitor 2. For example, in the case where the weed object OBJ is formed of a combination of polygons, sequential images are generated by moving the apexes. Thus, a video in which the pre-cutoff weed object OBJ is deformed to the post-cutoff weed object OBJc is created.

With reference to FIG. 8, how a weed object OBJ is waved will be described. There are a plurality of patterns of object images for representing how a weed object OBJ is waved on the monitor 2. Part (a) of FIG. 8 shows an object image of a pre-waving weed object OBJ. Parts (b) through (g) of FIG. 8 show object images of weed objects OBJn1 through OBJn6 waving in the direction of the respective arrows in FIG. 8. Part (h) of FIG. 8 shows an object image of a post-waving weed object OBJ. How the weed object OBJ is waved is represented as follows. First, the weed object is represented as falling down in the sword brandishing direction in a relatively fast motion (the weed objects OBJn1 through OBJn2 in parts (b) through (c) of FIG. 8). Then, the weed object is represented as rising up in a slower motion than the motion of falling down (the weed objects OBJn3 through OBJn6 in parts (d) through (g) of FIG. 8). Finally, the weed object is represented as having returned to the state similar to the pre-waving state (the weed object OBJ in part (h) of FIG. 8). Object images of the weed object OBJ changing in this manner are sequentially displayed on the monitor 2. For example, in the case where the weed object OBJ is formed of a combination of polygons, sequential images are generated by moving the apexes. Thus, a video in which the weed object OBJ is deformed as being waved is created.

The weed objects OBJ do not need to be waved in the same sword brandishing direction. For example, the weed objects OBJ corresponding to the collisions Cobj which have contacted the collision C2 of the sword object S may be waved in the sword brandishing direction, whereas the weed objects OBJ corresponding to the collisions Cobj which have contacted the collision C3 of the sword object S may be waved in radial directions around the player character, i.e., in directions generally perpendicular to the sword brandishing direction. Alternatively, the weed objects OBJ relatively close to the sword object S may be waved in the sword brandishing direction, whereas the weed objects OBJ relatively far from the sword object S may be waved in the radial directions. Still alternatively, the direction in which the weed objects OBJ are waved may be varied in accordance with the speed at which the sword object S is swung.

Figure 9:
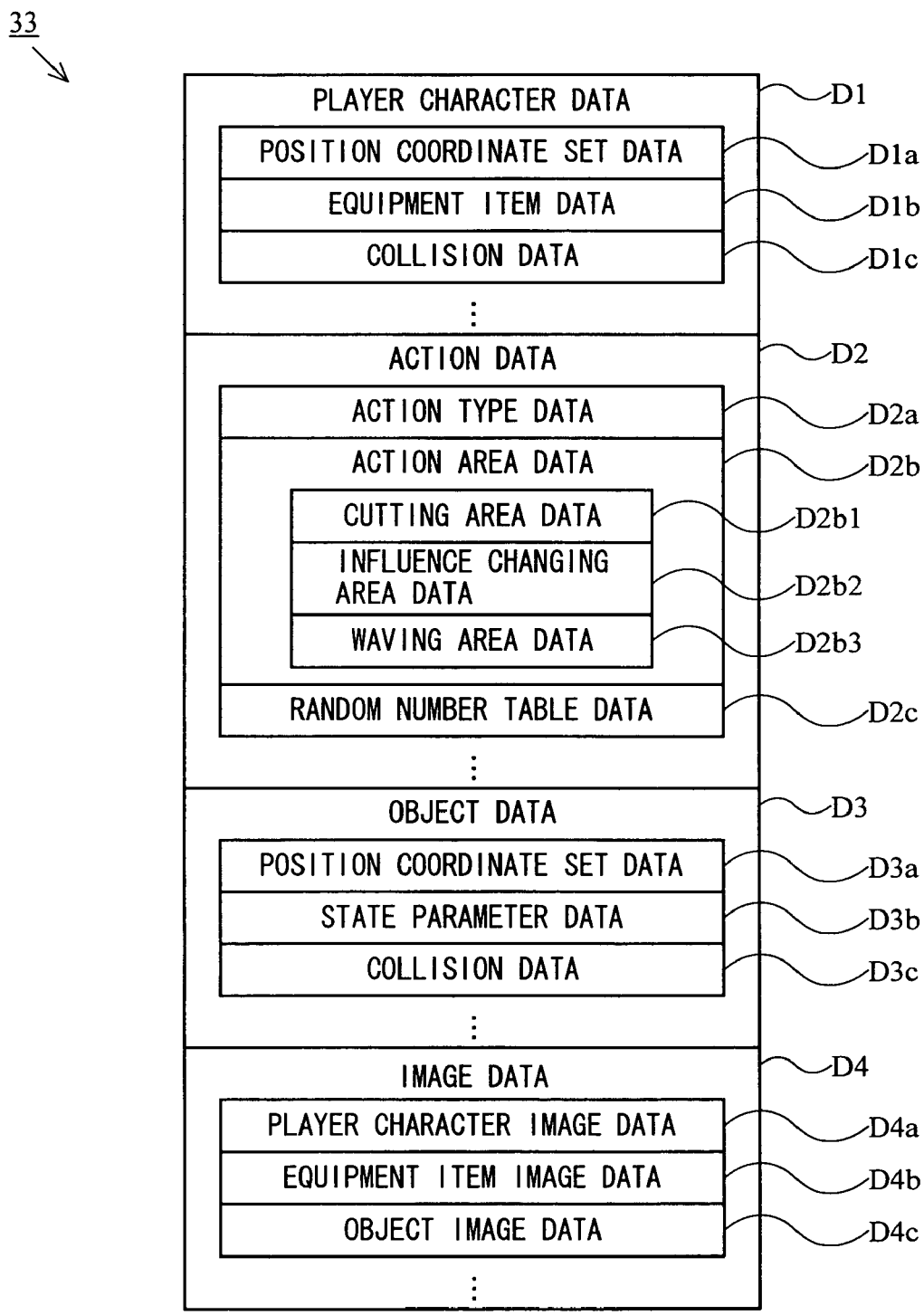
FIG. 9 is a schematic memory map showing an example of data stored in a main memory 33.

With reference to FIG. 9, exemplary data stored in the main memory 33 will be described. FIG. 9 is a schematic memory map provided for illustrating an example of data stored in the main memory 33. As described above, the game program or the like required for the processing performed by the CPU 30 is stored in the main memory 33 when necessary. The main memory 33 also stores the game program read from the optical disc 4 by the CPU, various data and the like. The main memory 33 includes a program storage area and a data storage area. FIG. 9 shows only the data storage area which is used for displaying images representing the influences to be exerted on the objects according to certain exemplary embodiments. Specifically, the data storage area of the main memory 33 generally has player character data D1, action data D2, object data D3, image data D4 and the like.

The player character data D1 includes position coordinate set data D1a, equipment item data D1b, collision data D1c and the like. The player character data D1 represents the player character, an equipment item carried by the player character, and the like. The position coordinate set data D1a is coordinate set data representing the position of the player character located in the virtual game world. The position coordinate set data D1a is set as, for example, a coordinate set in a three-dimensional game space on the game field. The equipment item data D1b represents the equipment item currently carried by the player character (for example, the sword). The collision data D1c represents collisions which are set for the equipment item represented by the equipment item data D1b (for example, the collisions C1 through C3).

The action data D2 includes action type data D2a, action area data D2b, random number table data D2c and the like. The action data D2 represents an action performed by the player character. The action type data D2a represents the type of the action performed by the player character (for example, brandishing a sword). The action type data D2a can determine parameters such as, for example, the equipment item moved by the action, and the reference position, direction, distance (angle) and speed of movement. The action area data D2b represents an area acted upon by the action represented by the action type data D2a (action area). The action area data D2b includes cutting area data D2b1, influence changing area data D2b2, waving area data D2b3 and the like. The cutting area data D2b1, the influence changing area data D2b2, the waving area data D2b3 are respectively coordinate set data representing the positions of the cutting area A1, the influence changing area A2 and the waving area A3 (see FIG. 5) which are set in the virtual game world. The cutting area data D2b1, the influence changing area data D2b2, the waving area data D2b3 are set as, for example, coordinate sets in the three-dimensional game space on the game field. The random number table data D2c represents a random number table which is used for setting an influence exerted on an object located in the influence changing area A2.

The object data D3 includes position coordinate set data D3a, state parameter data D3b, collision data D3c and the like. The object data D3 represents a respective object located in the virtual game world. The position coordinate set data D3a is coordinate set data representing the position of the object (for example, a weed object OBJ or an enemy object) located in the virtual game world. The position coordinate set data D3a is set as, for example, a coordinate set in the three-dimensional game space on the game field. The state parameter data D3b represents a state of the object (for example, a waved state, a cut state, a durability value, a stamina value, etc.). The collision data D3c represents the collision (for example, the collision Cobj) set for the object.

The image data D4 includes player character image data D4a, equipment item image data D4b, object image data D4c and the like. The image data D4 is used for locating the player character and various objects in the virtual game world to generate a game image.

Figure 11:
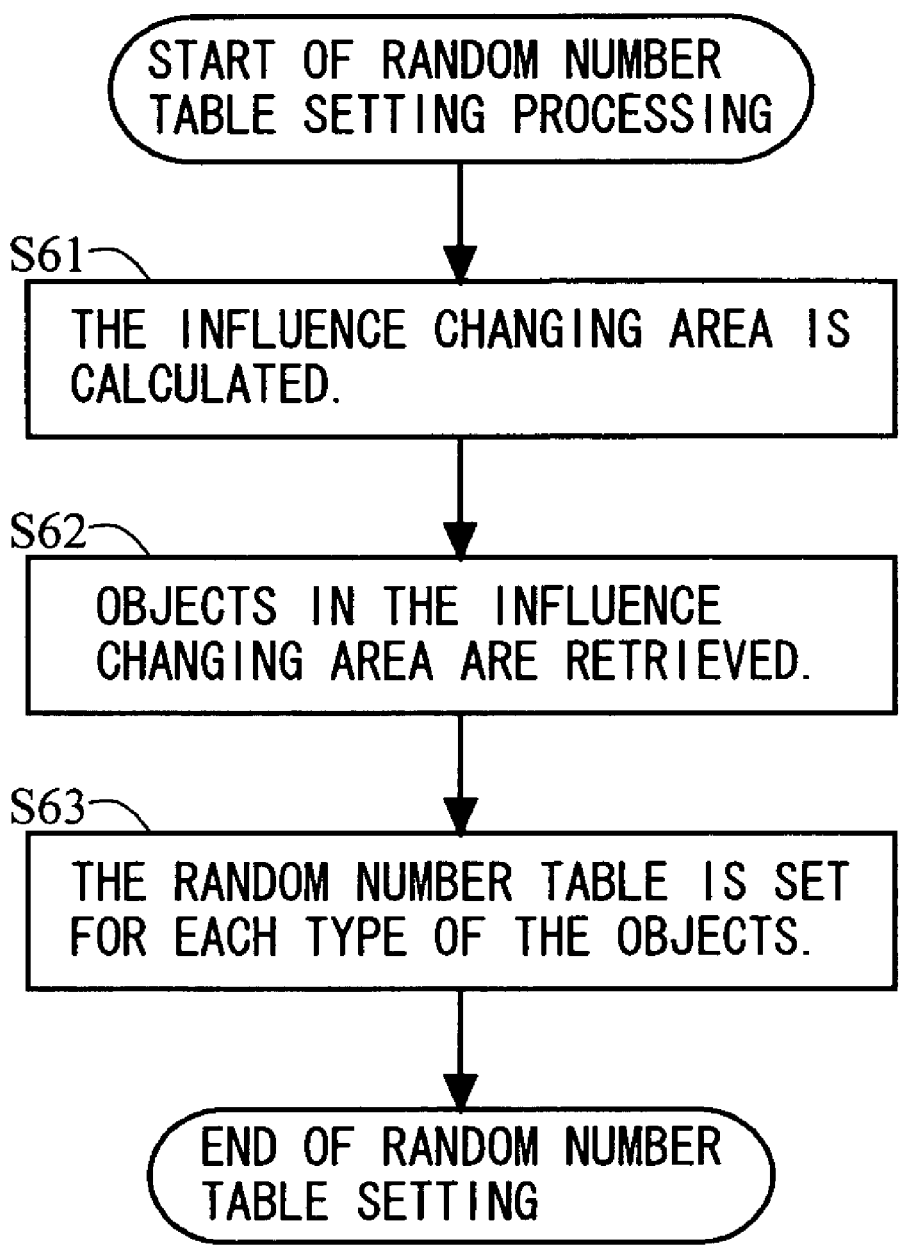
FIG. 11 is a flowchart illustrating a sub routine of random number table processing in step 53 in FIG. 10 in detail.
Figure 12:
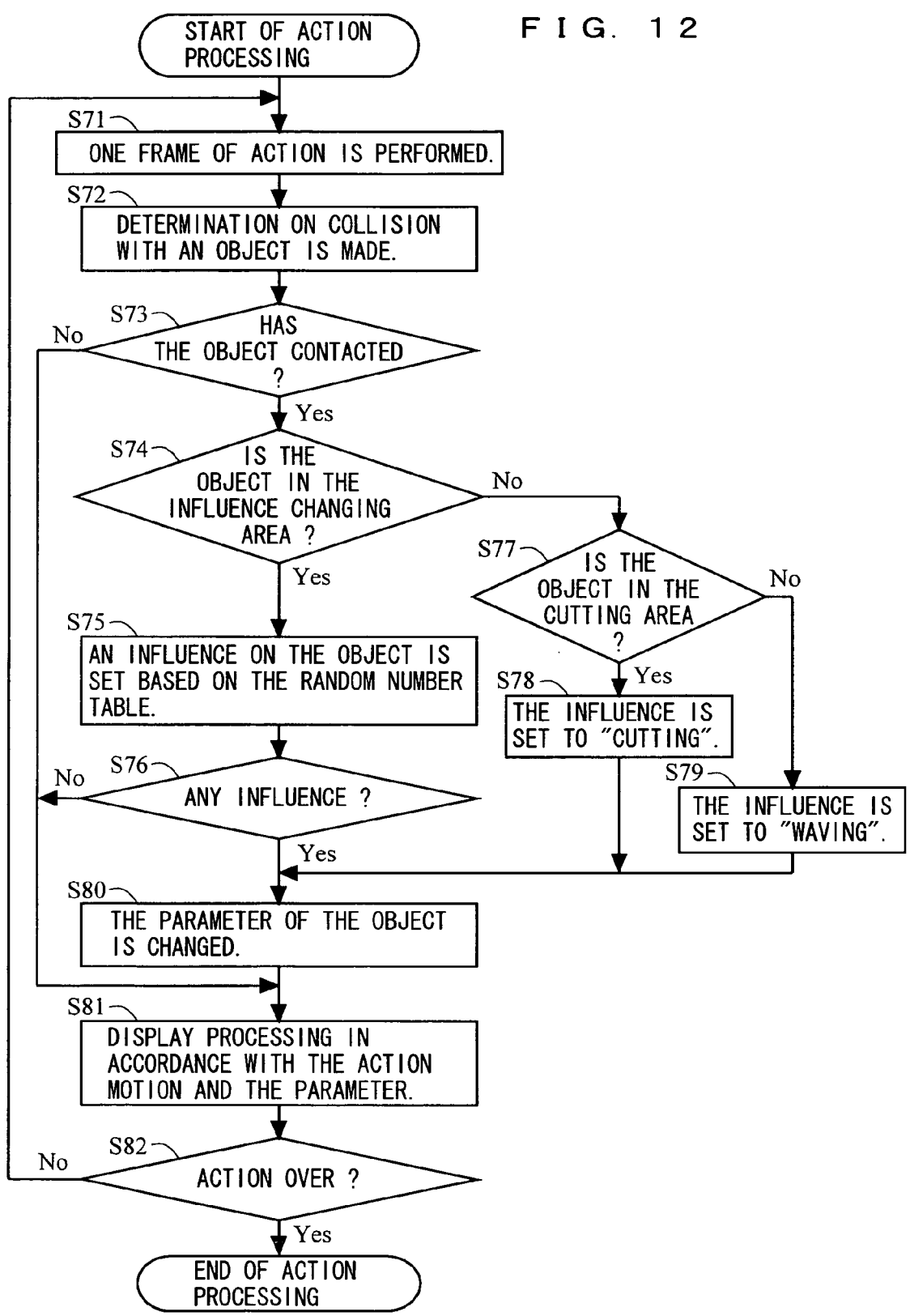
FIG. 12 is a flowchart illustrating a sub routine of action processing in step 55 in FIG. 10 in detail.

With reference to FIG. 10 through FIG. 13, game processing executed by the game apparatus 3 will be described. FIG. 10 is a flowchart illustrating the game processing executed by the game apparatus 3 for causing the player character to perform an action. FIG. 11 is a flowchart of a sub routine illustrating random number table setting processing in step S53 in FIG. 10 in detail. FIG. 12 is a flowchart of a sub routine illustrating action processing in step S55 in FIG. 10 in detail. FIG. 13 shows exemplary random number tables usable for the processing. With reference to the flowchart of FIG. 10, a part of the game processing regarding an action for influencing objects will be described, but other parts of the game processing which are not directly relevant to the exemplary embodiments described herein will not be described in detail. In FIG. 10 through FIG. 12, each "step" executed by the CPU 30 will be referred to as "S".

When the game apparatus 3 is turned on, the CPU 30 of the game apparatus 3 executes a boot program stored in a boot ROM (not shown) to initialize the elements of the game apparatus 3 including the main memory 33. Then, the game program stored on the optical disc 4 is read onto the main memory 33, and the CPU 30 starts executing the game program and displays a game image on the monitor 2. Thus, the game is started.

Referring to FIG. 10, the CPU 30 generates and displays a virtual game world in which the player character is located (step 50), and advances the processing to the next step. More specifically, in step 50, the CPU 30 sets the object data D3 to locate various objects including enemy objects at predetermined positions in the virtual game world. For example, a plurality of weed objects OBJ representing a mass of weeds growing together on the ground are located on the game field (see FIG. 3). The CPU 30 also sets the player character data D1 to locate the player character in the virtual game world. Then, the CPU 30 displays the virtual game world seen from a virtual camera on the monitor 2. In step 50, the image data D4 and the collisions C1 through C3 and Cobj are set in addition to the player character data D1 and the object data D3.

Next, the CPU 30 determines whether or not an action button has been turned on (step 51). For example, when the player has pressed the A button 62, the CPU 30 determines that the action button has been turned on. When the action button has been turned on, the CPU 30 advances the processing to step 52. By contrast, when the action button has not been turned on, the CPU 30 advances the processing to step 56.

In step 52, the CPU 30 determines an action to be performed by the player character (for example, an action of brandishing a sword) in accordance with the equipment item carried by the player character, the state of the game or the like. The CPU 30 stores the determined action in the action type data D2a. Then, the CPU 30 executes the random number table setting processing (step 53), and advances the processing to the next step. Hereinafter, with reference to FIG. 11, the random number table setting processing will be described.

Referring to FIG. 11, the CPU 30 calculates a value (parameter) for determining the influence changing area A2 (step 61), and advances the processing to the next step. More specifically, in step 61, the CPU 30 calculates the influence changing area A2 (see FIG. 5) using the coordinate set data D1a, the equipment item data D1b, and the collision data D1c of the player character data D1, and the action type data D2a. Then, the CPU 30 stores data representing the influence changing area A2 in the influence changing area data D2b2. For example, when the player conducts an operation to cause the player character to brandish a sword, the sword object S is swung at a predetermined angle so as to draw a circle in a generally horizontal direction around the player character. As described above, the influence changing area A2 is an arc-shaped area in which the collision C2 passes by the sword object S being swung in the sword brandishing direction. Accordingly, the influence changing area A2 can be calculated in advance using the equipment item to be used by the player character (the equipment item data D1b representing the sword object S), the collision forming the influence changing area A2 (the collision data D1c representing the collision C2), and the reference position, the direction and distance of movement of the collision as a result of the action (the position coordinate set data D1a, the action type data D2a).

Then, the CPU 30 retrieves an object located in the calculated influence changing area A2 (step 62), and advances the processing to the next step. More specifically, in step 62, the CPU 30 refers to the position coordinate set data D3a of each object located in the virtual game world to retrieve an object existing in the influence changing area A2 calculated in step 61. For example, when the objects OBJ are located as shown in FIG. 6, the weed objects OBJ2 are retrieved as the objects located in the influence changing area A2.

Next, the CPU 30 sets a random number table for each type of the objects retrieved in step 62 (step 63), and terminates the random number table processing in this sub routine. More specifically, in step 63, the CPU 30 sets a random number table for each type of the objects, in accordance with the number of objects retrieved in step 62, the type of objects to be cut off, the type of action, the swinging speed of the sword, and the like.

FIG. 13 shows exemplary random number tables which are set by the CPU 30. FIG. 13 shows random number tables of types A through G. In each of the random number table types A through G, the value "0" or "1" is set for each of the random numbers 1 through 16. For example, the random number table of type A has the value "1" for the random numbers 3, 7 and 11, and has the value "0" for the other random numbers. The appearance probability of the value "1" is about 19%. The random number table of type G has the value "0" for the random numbers 2 and 14, and has the value "1" for the other random numbers. The appearance probability of the value "1" is about 88%. The CPU 30 sets a random number table to be used for each type of the objects, in accordance with the type of the objects and the number of the objects of each type retrieved in step 62.

As described in detail later, the processing of cutting off a weed object OBJ is executed for the value "1" of a random number table, and the processing of waving a weed object OBJ is executed for the value "0" of a random number table. Namely, each description of a random number table is determined as an influence to be exerted on an object which has contacted the sword object S. When a random number table having a higher appearance probability of the value "1" is selected, a larger number of weed objects OBJ are cut off. When a motion of brandishing a sword object S is represented, the game world is made closer to the real world by varying the number of the weed objects OBJ to be cut off based on the number of weeds OBJ contacting the sword object S, the swinging speed of the sword object S, the type of action, and the type of weeds contacting the sword object S. Therefore, the CPU 30 selects a random number table having a higher appearance probability of the value "1" when a larger number of weed objects OBJ are to be cut, for example, when the swords object S contacts a relatively small number of weed objects OBJ, when the swinging speed of the sword object S is relatively high, when the type of action is relatively suitable to cut the weed objects OBJ, or when the weed objects OBJ contacting the sword object S is of a type relatively easy to be cut. In other words, by setting a random number table for each type of the objects contacting the sword object S, the probability at which an influence is selected from a plurality of preset influences (for example, "cutoff" or "waved") is determined for each type of the objects. As a result, for example, when the number of the weed objects OBJ located in the influence changing area A2 is relatively small, a random number table for causing the influence of being "cut off" to be selected at a relatively high probability is used.

Returning to FIG. 10, after the random number table setting processing in step 53 is finished, the CPU 30 calculates the cutting area A1 and the waving area A3 (step 54), and advances the processing to the next step. More specifically, in step 54 like in step 61, the CPU 30 calculates the cutting area A1 and the waving area A3 (see FIG. 5) using the coordinate set data D1*a*, the equipment item data D1*b*, and the collision data D1*c* of the player character, and the action type data D2*a*. Then, the CPU 30 stores data representing the cutting area A1 in the cutting area data D2*b*1 and stores data representing the waving area A3 in the waving area data D2*b*3. Specifically, like in step 61, the cutting area A1 and the waving area A3 can be calculated in advance using the equipment item to be used by the player character (the equipment item data D1*b* representing the sword object S), the collision forming the cutting area A1 and the collision forming the waving area A3 (the collision data D1*c* representing the collisions C1 and C3), and the reference position, direction and distance of movement of the respective collisions as a result of the action (the position coordinate set data D1*a*, the action type data D2).

Next, the CPU 30 executes the action processing (step 55) and advances the processing to the next step. Hereinafter, with reference to FIG. 12, the action processing will be described.

Referring to FIG. 12, the CPU 30 performs an action determined in step 52 for a processing unit time (for example, one frame; 1/60 min.) of the game processing (step 71). Each time the action is performed for one frame in step 71, the CPU 30 determines whether or not the equipment item (the sword object S) moved in the virtual game world by the action has collided against any other object (step 72) and advances the processing to the next step. More specifically, in step 72, in the case of an action of swinging the sword object S having the collisions C1*a*, C1*b*, C2 and C3 (see FIG. 5) to slash the weed objects OBJ, the CPU 30 determines whether or not one of the collisions C1*a*, C1*b*, C2 and C3 has contacted any of collisions Cobj of the weed objects OBJ (see FIG. 6).

Next, the CPU 30 determines whether or not the equipment item has contacted any other object (step 73) in the determination of step 72. When the equipment item has contacted any other object, the CPU 30 advances the processing to step 74. By contrast, when the equipment item has not contacted any other object, the CPU 30 advances the processing to step 81.

In step 74, the CPU 30 determines whether or not the object which has contacted the equipment item is in the influence changing area A2; and when not, the CPU 30 determines whether or not the object which has contacted the equipment item is in the cutting area A1 (step 77). When the object which has contacted the equipment item is in the influence changing area A2 (YES in step 74; for example, when a weed object OBJ2 in FIG. 6 has contacted the equipment item), the CPU 30 advances the processing to step 75. When the object which has contacted the equipment item is in the cutting area A1 (YES in step 77; for example, when a weed object OBJ1 in FIG. 6 has contacted the equipment item), the CPU 30 advances the processing to step 78. When the object which has contacted the equipment item is neither in the influence changing area A2 nor in the cutting area A1 but in the waving area A3 (No in step 74 and also in step 77; for example, when a weed object OBJ3 has contacted the equipment item), the CPU 30 advances the processing to step 79.

In step 75, the CPU 30 sets an influence to be exerted on the object which has contacted the equipment item based on the random number table which was set in step 53, and advances the processing to the next step. More specifically, each operation of step 75 is performed as follows. In the case where one of the random number tables shown in FIG. 13 is set, the CPU 30 sequentially refers to the numerical value set for the immediately adjacent random number (e.g., the random number "1" in the case where the previous random number is "16") to make a distinction between "1" and "0" for setting an influence to be exerted on the object. When the numerical value represented by the current random number of the random number table is "1", the CPU 30 sets the influence to be exerted on the object to "cutting". When the numerical value represented by the current random number of the random number table is "0", the CPU 30 sets the influence to be exerted on the object to "waving". Namely, the influence to be exerted on the object which has contacted the equipment item is selected from a plurality of influences (for example, "cutting" and "waving") at a predetermined probability and thus determined. For each operation of step 75, the CPU 30 may generate a new random number and refer to the numerical value corresponding to the new random number to make a distinction for setting an influence to be exerted on the object.

Next, the CPU 30 determines whether or not the influence set in step 75 is exerted on the object (step 76). When the influence is exerted on the object (YES in step 76), the CPU 30 advances the processing to step 80. By contrast, when the influence is not exerted on the object (NO in step 76), the CPU 30 advances the processing to step 81. In the case where the influence to be exerted on the object is set to "cutting" or "waving" in step 75, the influence is necessarily exerted on the object. Therefore, it is necessarily determined in step 76 that the influence is exerted on the object. By contrast, as described in detail later, when the influence to be exerted on an object is set to "no influence" in step 75 based on the numerical value represented by the random number table, such an influence may be determined not to be exerted on the object in step 76.

When the object which has contacted the equipment item is in the cutting area A1 (YES in step 77), the CPU 30 sets the influence to be exerted on the object to "cutting" in step 78, and advances the processing to step 80.

When the object which has contacted the equipment item is in the waving area A3 (NO in step 74 and also in step 77), the CPU 30 sets the influence to be exerted on the object to "waving" in step 79, and advances the processing to step 80.

In step 80, the CPU 30 changes the parameter of the object based on the influence to be exerted on the object which was set in step 75, 78 or 79, and describes the post-change parameter in the state parameter data D3*b*. Then, the CPU 30 creates a game image representing an object in a state based on an action of the player character and the parameter, and executes processing of displaying the game image on the monitor 2 (step 81). The CPU 30 determines whether the action determined in step 52 is to be terminated (step 82). When the action is to be continued (NO in step 82), the CPU 30 returns the processing to step 71 to be repeated. By contrast, the action is to be terminated (YES in step 82), the CPU 30 terminates the action processing in this sub routine.

Returning to FIG. 10, the CPU 30 determines whether or not to terminate the game (step 56). The game is terminated in the case where, for example, a condition for terminating the game is fulfilled (for example, when the parameter representing the stamina of the player character has become zero) or when the player has conducted an operation to terminate the game. When the game is not to be over (NO in step 56), the CPU 30 returns the processing to step 51 to be repeated. By contrast, when the game is not to be over (YES in step 56), the CPU 30 terminates the processing in the flowchart of FIG. 10.

In the above exemplary embodiment, the processing of cutting the weed objects OBJ using the sword object S has been mainly described. The certain exemplary embodiments described herein are also applicable to an enemy object or the like which has a durability value or a stamina value as a parameter (hereinafter, referred to simply as an "enemy object"). In this case, a random number table which allows various numerical values to be set for random numbers in addition to "0" and "1" is used. FIG. 14 shows exemplary random number tables applicable to enemy objects. Hereinafter, the processing executed by the game apparatus 3 when certain exemplary embodiments are applied to enemy objects will be described mainly regarding the differences from the above.

FIG. 14 shows random number tables of types H through K. In each of the random number table types H through K, a value of "0" through "100" can be set for each of the random numbers 1 through 16. For example, the random number table of type H has the value "10" for the random numbers 1, 3 and 7, has the value "20" for the random number 11, and has the value "0" for the other random numbers. The total appearance probability of the values "10" and "20" is about 25%. The random number table of type K has the value "0" for the random numbers 2 and 14, and has a value of "20" through "100" for the other random numbers. The total appearance probability of values "20" through "100" is about 88%. As is clear from FIG. 14, the appearance probability of a value other than "0" ascends in the order from type H to type I to type J and to type K. Also in this order, the probability at which a higher value appears ascends.

In the above exemplary embodiment, the processing of cutting off a weed object OBJ is executed for the value "1" of a random number table, and the processing of waving a weed object OBJ is executed for the value "0" of a random number table. On enemy objects, the processing of decreasing the durability value or the stamina value is executed in accordance with the numerical value in the random number table. When a random number table having a lower appearance probability of the value "0" and a higher appearance probability of a relatively large value is selected, the damage caused to the enemy object is greater. When a motion of brandishing a sword object S is represented, the game world is made closer to the real world by varying a damage degree caused to the enemy object based on the number of enemy objects contacting the sword object S, the swinging speed of the sword object S, the type of action, and the type of enemy objects contacting the sword object S. Therefore, in step 63, the CPU 30 sets a random number table to be used for each type of enemy objects, in accordance with the type of the enemy objects and the number of the enemy objects of each type retrieved in step 62. The CPU 30 selects a random number table having a lower appearance probability of the value "0" and a higher appearance probability of a relatively high value. When a greater damage is to be caused to the enemy objects, for example, when the sword object S contacts a relatively small number of enemy objects, when the swinging speed of the sword object S is higher, or when the type of action is relatively suitable to damage the enemy objects.

In step 75, the CPU 30 sets an influence to be exerted on each enemy object which has contacted the equipment item based on the random number table, and advances the processing to the next step. More specifically, each operation of step 75 is performed as follows like in the case of the weed objects OBJ. The CPU 30 sequentially refers to the numerical value set for the immediately adjacent random number (e.g., the random number "1" in the case where the previous random number is "16") to make a distinction between "1" and "0" for setting an influence to be exerted on the object. When the numerical value represented by the current random number of the random number table is "0", the CPU 30 sets the influence to be exerted on the enemy object to "no influence". When the numerical value represented by the current random number of the random number table is other than "0", the CPU 30 sets the influence to be exerted on the enemy object to a value obtained by subtracting the value represented by the random number table from the durability value or the stamina value of the enemy object. Namely, the influence to be exerted on the enemy object which has contacted the equipment item is selected from a plurality of influences (for example, a plurality of "damage degrees" and "no influence" represented by the numerical values) at a predetermined probability and thus determined.

When it is determined in step 76 that the durability value or the stamina value of the enemy object needs to be decreased as set in step 75, the CPU 30 advances the processing to step 80. By contrast, when it is determined in step 76 that there is no influence to be exerted on the enemy object, the CPU 30 advances the processing to step 81.

In step 80, the CPU 30 subtracts the value represented by the random number table from the durability value or the stamina value of the enemy object to change the parameter of the enemy object, and describes the post-change parameter in the state parameter data D3*b*. Then, the CPU 30 creates a game image representing an enemy object in a state based on an action of the player character and the post-subtraction durability value or stamina value, and executes processing of displaying the game image on the monitor 2 (step 81).

When the enemy object which has contacted the equipment item is in the cutting area A1 (YES in step 77), the CPU 30 may set a fixed value preset for each type of the enemy objects (for example, "50") as a value to be subtracted from the durability value or stamina value of the enemy object in step 78. When the enemy object which has contacted the equipment item is in the waving area A3 (No in step 74 and also in step 77), the CPU 30 sets the influence to be exerted on the enemy object to "agitated" in step 79. Herein, "agitated" refers to a state where, when the sword object S is swung, the enemy object performs a motion influenced in some way by such a motion of the player character although no value is subtracted from the durability value or stamina value. For example, "agitated" refers to, for example, that the enemy object is influenced by an air pressure by the swing of the sword object S or moves to avoid the sword object S.

The certain exemplary embodiments are also applicable to an object, such as an enemy object, which has a durability value or a stamina value as a parameter by altering the random number tables and the processing steps described above. In the above description regarding the enemy objects, the influence to be exerted on an enemy object is varied in accordance with whether the enemy object is located in the cutting area A1, the influence changing area A2 or the waving area A3. Alternatively, the areas may be separated in other manners. For example, the entirety of the areas A1 and A2 may be an influence changing area. The manner of area separation and the shape of the areas may be varied in accordance with the equipment item used for the action.

As described above, with the game system in this exemplary embodiment, the possibility of each object as a target of the action of the player character (for example, the object which can be slashed by the sword object S) being cut or slashed is varied using a predetermined random number determined by the number of the objects or the like. When the player character attempts to slash a large number of objects with one swing of the sword object S, the number of the objects which can be slashed is decreased in order to make it difficult to slash the objects. By contrast, when the player character attempts to slash a small number of objects with one swing of the sword object S, the number of the objects which can be slashed is increased in order to make it easy to slash the objects. In this way, even when the player character performs a motion of cutting a large number of weed objects OBJ with the sword object S, the player character initially cannot cut all the weed objects OBJ like in the real world. As the number of the weed objects OBJ gradually decreases, it becomes easier to cut the weed objects OBJ. In this manner, the game world can be represented realistically. In the virtual game world, the player character can exert an influence on an object by performing an action in a manner closer to the real world.

With the game system in this exemplary embodiment, even the weed objects OBJ which have not contacted the sword object OBJ (the weed objects OBJ in the waving area A3) are represented as being waving. The weed objects OBJ located outside the conventional valid area, i.e., the weed objects OBJ conventionally not influenced by the motion of the sword object S are now influenced. In the virtual game world, the player character can exert an influence on an object located in the conventional valid area by performing an action. Thus, the game is more realistic to the player.

In the above exemplary embodiment, the collisions C1 through C3 are set for the sword object S, and areas in which the collisions C1 through C3 pass are set as the cutting area A1, the influence changing area A2 and the waving area A3. The collisions and the areas may be set in different manners. For example, in the case where it is not necessary to represent the weeds around the swung sword as waving, only the collisions C1 and C2 may be set for the sword object S, and areas in which the collisions C1 and C2 pass may be set the cutting area A1 and the influence changing area A2. The area in which collision C1 passes may also be set as the influence changing area A2. In this case, whether each weed object OBJ contacting the sword object S is to be cut or not is determined based on the random number table.

In the above exemplary embodiment, a random number table is used. Alternatively, a random number may be simply calculated as described below in more detail. In the above exemplary embodiment, in order to determine an influence to be exerted on a weed object OBJ, a random number table in which the value "0" or "1" are set is used. For increasing the number of weed objects OBJ to be cut, a random number table having a larger appearance probability of "1" is selected. Alternatively, a random number may be calculated such that the appearance probability of "1" is increased. This is also applicable to the enemy objects. In the above exemplary embodiment, for increasing the damage degree caused to the enemy object, a random number table for decreasing the durability value or the stamina value of the enemy object by a higher degree, i.e., a random number table providing a higher damage degree, is used. Alternatively, the damage itself may be calculated using a random number such that the damage degree caused to the enemy object is increased.

Still alternatively, the random numbers set in the random number table, or the range of values of the random number to be calculated, may be restricted in accordance with the number of objects contacting the sword object S, the swinging speed of the sword object S, the type of action, the type of the objects contacting the sword object S, or the like.

In the above exemplary embodiment, in order to determine an influence to be exerted on a weed object OBJ, a random number table in which the value "0" or "1" can be set is used. Other types of random number tables may be used. For example, the random number tables shown in FIG. 14 may be used instead of the random number tables shown in FIG. 13, provided that the values other than "0" in FIG. 14 are considered as the value "1". In this case, the random number tables shown in FIG. 14 may be used as random number tables in which the value "0" or "1" can be set.

In the above exemplary embodiment, in order to determine an influence to be exerted on a weed object OBJ, a random number table in which the value "0" or "1" can be set is used. Alternatively, a random number table having only the value "0" or only the value "1" may be used. In this case, the weed objects OBJ located in the influence changing area A2 are all waved or all cut off.

In the above exemplary embodiment, an area in which the collision C2 set for the sword object S passes along with the motion of the player character swinging the sword object S is set as the influence changing area A2 before the motion is started. A random number table is set in accordance with the number or type of the objects located in the influence changing area A2, such that a certain influence is exerted on the objects at a predetermined probability. It is not absolutely necessary to set an area in which a collision will pass, such as the influence changing area A2, before the motion of the player character is started. When such an area is not preset, a random number table cannot be set in accordance with the number or type of the objects because the number of the objects which will contact the collision or the like cannot be predicted. A fixed random number table may be used to determine an influence which is exerted each time a collision occurs. Alternatively, a random number table may be set in accordance with the type or position of the first object which collided against the sword object S after the motion of the player character is started, such that the object is influenced at a predetermined probability in accordance with the random number table.

A storage medium having a game program stored thereon and a game apparatus according to certain exemplary embodiments described herein allow an action or the like performed by the player character in a virtual game world to influence an object in a manner closer to the real world, and thus are useful for, for example, a game representing a virtual game world in which various types of objects appear.

While certain exemplary embodiments have been described in detail, the foregoing description is in all aspects illustrative and not restrictive. It is understood that numerous other modifications and variations can be devised without departing from the scope of these exemplary embodiments.

What is claimed is:

1. A non-transitory storage medium having stored thereon a game program executable by a computer of a game apparatus for displaying a virtual game world, in which a player character whose motion is controlled by an input signal from an input device in accordance with an operation performed by a player appears as well as a plurality of objects, as a game image on a display screen, the game program causing the computer to execute:

setting a first collision determination area and a second collision determination area moving concurrently with the motion of the player character;

detecting a collision of one of the first collision determination area and the second collision determination area against an object among the plurality of objects;

each time a collision of the first collision determination area against an object is detected, determining an influence, to be exerted on the object which has collided against the first collision determination area, as being one of a plurality of preset influences at a predetermined probability;

each time a collision of the second collision determination area against an object is detected, determining an influence, to be exerted on the object which has collided against the second collision determination area, as being a predetermined influence; and changing a display state of each of the influenced objects to a display state in accordance with the determined influence to be exerted on the object which has collided against the first collision determination area and the determined influence to be exerted on the object which has collided against the second collision determination area, wherein the collision detection includes setting a passing area in which the first collision determination area passes along with the motion of the player character before the motion is started, and determining the influence to be exerted on the object which has collided against the first determination area includes determining the predetermined probability in accordance with the number of objects included in the passing area.

2. A non-transitory storage medium according to claim 1, wherein a probability, at which the influence is determined as being a first influence included in the plurality of preset influences, is set to be inversely proportional to the number of objects in the passing area.

3. A non-transitory storage medium according to claim 2, wherein the probability determination determines the predetermined probability for each type of objects located in the passing area in accordance with the number of the objects of each type.

4. A game apparatus for displaying a virtual game world, in which a player character whose motion is controlled by an input signal from an input device in accordance with an operation performed by a player appears as well as a plurality of objects, as a game image on a display screen, the game apparatus comprising:

a processor coupled to the input device and the display screen;

a memory coupled to said processor, said memory storing instructions that, when executed by said processor, control said processor to:

(a) set a first collision determination area and a second collision determination area moving concurrently with the motion of the player character;

(b) detect a collision of one of the first collision determination area and the second collision determination area against an object among the plurality of objects;

(c) each time the collision detector detects a collision of the first collision determination area against an object, determine an influence, to be exerted on the object which has collided against the first collision determination area, as being one of a plurality of preset influences at a predetermined probability;

(d) each time the collision detector detects a collision of the second collision determination area against an object, determine an influence, to be exerted on the object which has collided against the second collision determination area, as being a predetermined influence; and (e) change a display state of each of the influenced objects to a display state in accordance with the determined influences, wherein the collision detection includes setting a passing area in which the first collision determination area passes along with the motion of the player character before the motion is started, and determining the influence to be exerted on the object which has collided against the first determination area includes determining the predetermined probability in accordance with the number of objects included in the passing area.

5. A method for displaying a virtual game world on a display screen, in which a player character whose motion is controlled by an input signal from an input device in accordance with an operation performed by a player appears as well as a plurality of objects, as a game image on a display screen, the method comprising setting a first collision determination area and a second collision determination area moving concurrently with the motion of the player character;

detecting a collision of one of the first collision determination area and the second collision determination area against an object among the plurality of objects;

each time a collision of the first collision determination area against an object is detected, determining an influence, to be exerted on the object which has collided against the first collision determination area, as being one of a plurality of preset influences at a predetermined probability;

each time a collision of the second collision determination area against an object is detected, determining an influence, to be exerted on the object which has collided against the second collision determination area, as being a predetermined influence; and changing a display state of each of the influenced objects displayed on the display screen to a display state in accordance with the determined influence to be exerted on the object which has collided against the first collision determination area and the determined influence to be exerted on the object which has collided against the second collision determination area, wherein detecting a collision includes setting a passing area in which the first collision determination area passes along with the motion of the player character before the motion is started, and determining the influence to be exerted on the object which has collided against the first determination area includes determining the predetermined probability in accordance with the number of objects included in the passing area.

6. A game system for displaying a virtual game world, in which a player character whose motion is controlled by an input signal from an input device in accordance with an operation performed by a player appears as well as a plurality of objects, as a game image on a display screen, the game system comprising:

a processor coupled to the input device and the display screen;

a memory coupled to said processor, said memory storing instructions that, when executed by the processor, control the processor to:

(a) set a first collision determination area and a second collision determination area moving concurrently with the motion of the player character;

(b) detect a collision of one of the first collision determination area and the second collision determination area against an object among the plurality of objects;

(c) each time the collision detector detects a collision of the first collision determination area against an object, determine an influence, to be exerted on the object which has collided against the first collision determination area, as being one of a plurality of preset influences at a predetermined probability;

(d) each time the collision detector detects a collision of the second collision determination area against an object, determine an influence, to be exerted on the object which has collided against the second collision determination area, as being a predetermined influence; and (e) change a display state of each of the influenced objects to a display state in accordance with the determined influences, wherein detecting a collision includes setting a passing area in which the first collision determination area passes along with the motion of the player character before the motion is started, and determining the influence to be exerted on the object which has collided against the first determination area includes determining the predetermined probability in accordance with the number of objects included in the passing area.

* * * * *